United States Patent
Ishii et al.

(10) Patent No.: US 9,491,515 B2
(45) Date of Patent: Nov. 8, 2016

(54) PROGRAM RECORDING METHOD, PROGRAM RECORDING DEVICE, DESTINATION SETTING METHOD, AND DESTINATION SETTING DEVICE

(71) Applicant: Panasonic Intellectual Property Corporation of America, Torrance, CA (US)

(72) Inventors: Yasunori Ishii, Osaka (JP); Kazutaka Furuta, Osaka (JP); Tsutomu Muraji, Nara (JP); Toshihisa Nakano, Osaka (JP); Yuka Ozawa, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 97 days.

(21) Appl. No.: 14/413,837

(22) PCT Filed: May 2, 2014

(86) PCT No.: PCT/JP2014/002414
§ 371 (c)(1),
(2) Date: Jan. 9, 2015

(87) PCT Pub. No.: WO2014/185029
PCT Pub. Date: Nov. 20, 2014

(65) Prior Publication Data
US 2015/0208130 A1    Jul. 23, 2015

Related U.S. Application Data

(60) Provisional application No. 61/824,767, filed on May 17, 2013.

(51) Int. Cl.
*H04N 5/76* (2006.01)
*H04N 21/472* (2011.01)
(Continued)

(52) U.S. Cl.
CPC ........ *H04N 21/47214* (2013.01); *G01C 21/34* (2013.01); *H04N 5/445* (2013.01);
(Continued)

(58) Field of Classification Search
CPC ................... H04N 21/4345; H04N 21/4586; H04N 5/775
USPC ................. 386/291, 296, 297, 299
See application file for complete search history.

(56) References Cited

U.S. PATENT DOCUMENTS 8,738,371 B2 * 5/2014 Sumita ................... G10L 15/22
318/568.12
2005/0197059 A1    9/2005 Numakami et al.
(Continued)

FOREIGN PATENT DOCUMENTS

JP    2001-339683    12/2001
JP    2003-218718    7/2003
(Continued)

OTHER PUBLICATIONS

International Search Report issued Jul. 22, 2014 in International (PCT) Application No. PCT/JP2014/002414.
(Continued)

*Primary Examiner* — Robert Chevalier
(74) *Attorney, Agent, or Firm* — Wenderoth, Lind & Ponack, L.L.P.

(57) ABSTRACT

A destination setting unit (901) receives setting of a destination by the user when a route from a present position to the destination is guided. A user specifying unit (902) judges whether the user who sets the destination is the user who performs program recording reservation. When the user is judged to be the user who performs program recording reservation, a keyword extracting unit (903) extracts a keyword for use in performing program recording reservation based on the destination. A keyword display unit (904) presents the user with the extracted keyword. A keyword selecting unit (905) receives selection, by the user, of the presented keyword. A program selecting unit (906) selects a program associated with the keyword. A program reservation unit (907) reserves recording of the selected program.

15 Claims, 19 Drawing Sheets

(51) Int. Cl.

| | | |
|---|---|---|
| G01C 21/34 | (2006.01) | |
| H04N 5/782 | (2006.01) | |
| H04N 21/4227 | (2011.01) | |
| H04N 21/433 | (2011.01) | |
| H04N 21/482 | (2011.01) | |
| H04N 5/445 | (2011.01) | |
| H04N 21/222 | (2011.01) | |
| H04N 21/262 | (2011.01) | |
| H04N 21/4147 | (2011.01) | |
| H04N 21/434 | (2011.01) | |
| H04N 21/458 | (2011.01) | |
| H04N 5/775 | (2006.01) | |

(52) U.S. Cl.
CPC ............... *H04N 5/76* (2013.01); *H04N 5/775* (2013.01); *H04N 5/782* (2013.01); *H04N 21/2221* (2013.01); *H04N 21/26291* (2013.01); *H04N 21/4147* (2013.01); *H04N 21/4227* (2013.01); *H04N 21/4334* (2013.01); *H04N 21/4345* (2013.01); *H04N 21/4586* (2013.01); *H04N 21/4828* (2013.01)

(56) References Cited

U.S. PATENT DOCUMENTS

| | | |
|---|---|---|
| 2009/0018763 A1 | 1/2009 | Koga et al. |
| 2009/0043496 A1 | 2/2009 | Koga et al. |
| 2009/0165049 A1 | 6/2009 | Sekiguchi |
| 2010/0091198 A1 | 4/2010 | Matsuo |

FOREIGN PATENT DOCUMENTS

| | | |
|---|---|---|
| JP | 2005-203957 | 7/2005 |
| JP | 2005-229226 | 8/2005 |
| JP | 2007-37046 | 2/2007 |
| JP | 2008-278400 | 11/2008 |
| JP | 2009-17514 | 1/2009 |
| JP | 2010-133978 | 6/2010 |
| JP | 4675375 | 4/2011 |
| JP | 4675376 | 4/2011 |
| JP | 2011-106957 | 6/2011 |
| JP | 2012-39609 | 2/2012 |
| WO | 2007/072864 | 6/2007 |

OTHER PUBLICATIONS

Partial Supplementary European Search Report issued May 4, 2016 in European Application No. 14798519.6.

\* cited by examiner

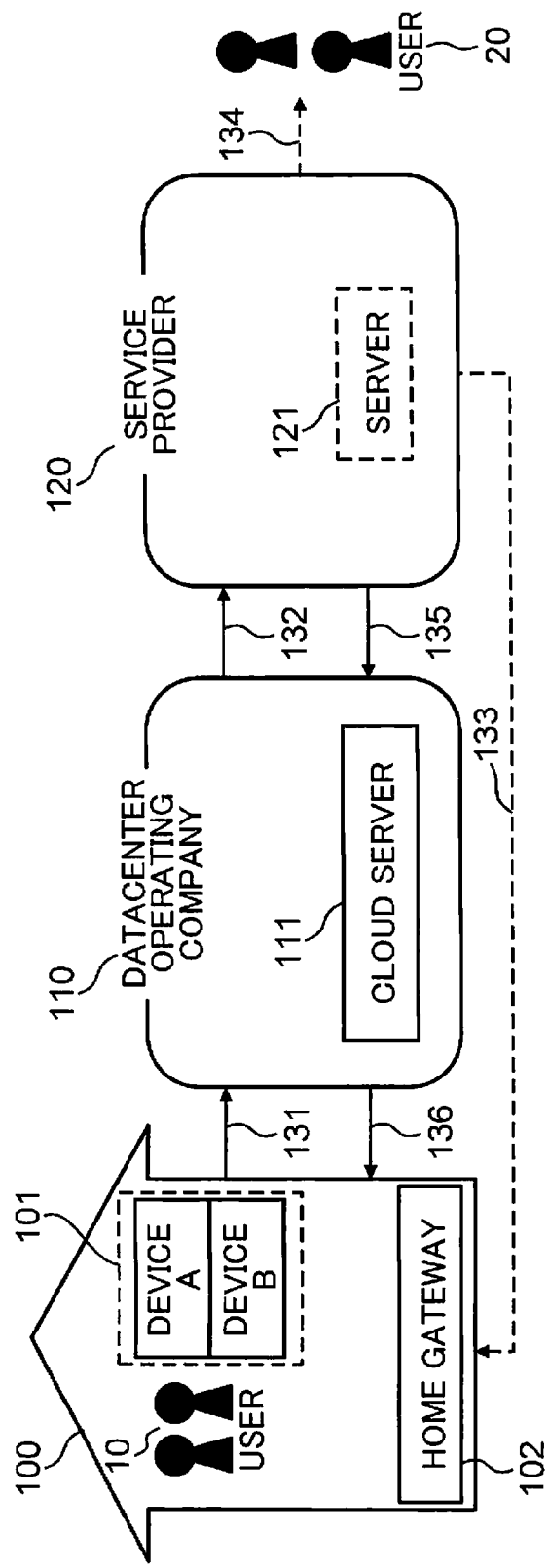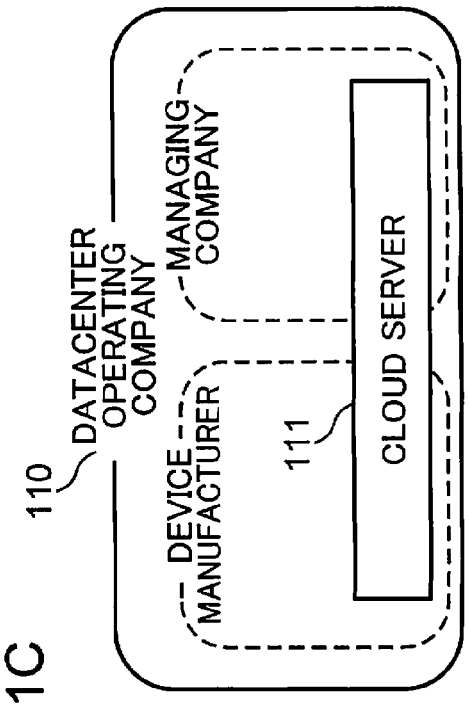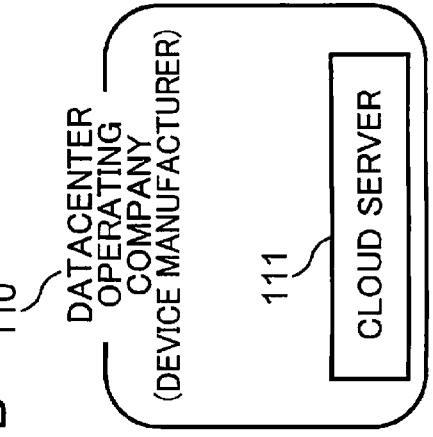

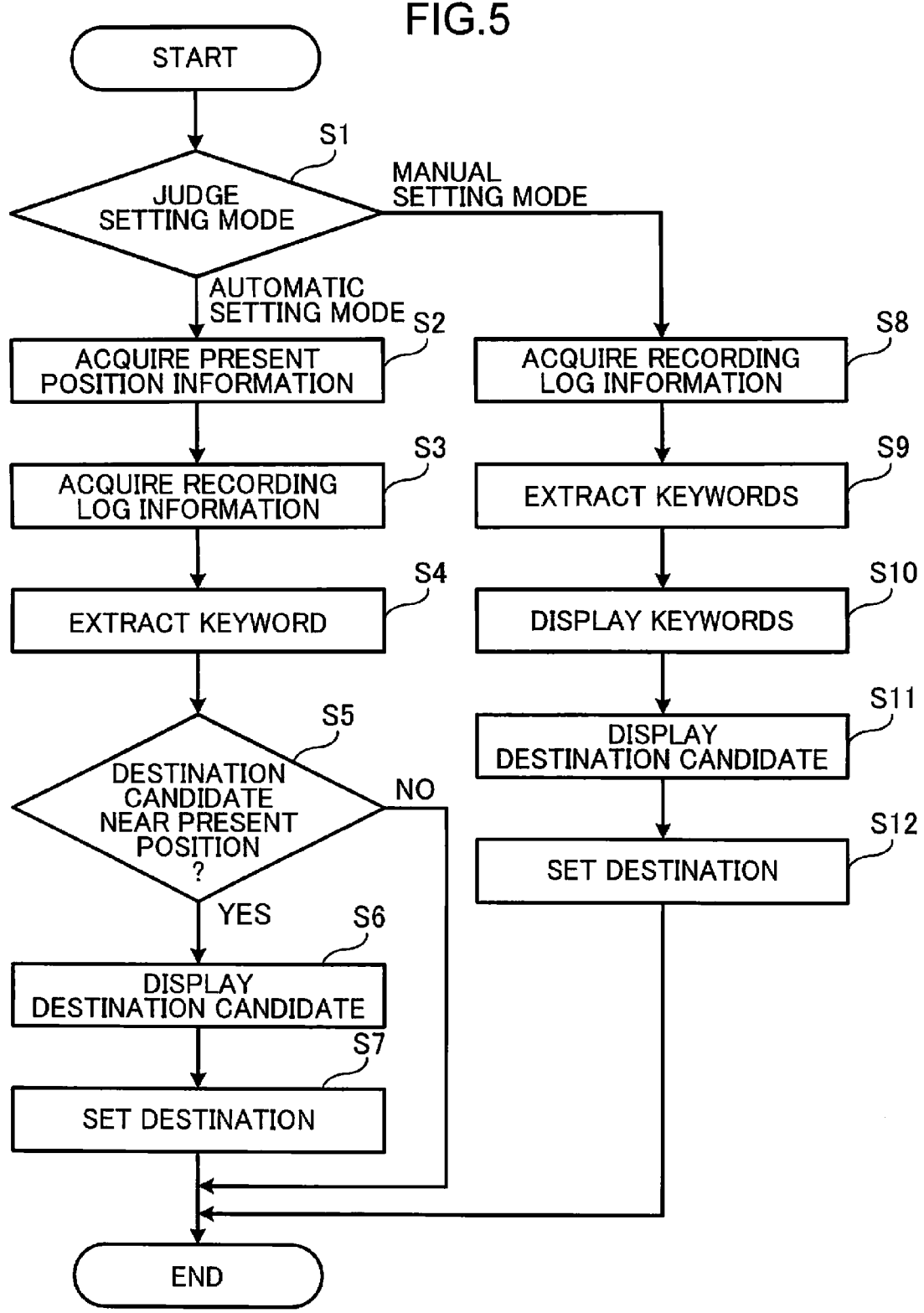

FIG.6

| DATE AND TIME | CHANNEL | PROGRAM NAME | GENRE | USER ID | SCENE 1 | | | | | SCENE 2 | | | | | ... |
|---|---|---|---|---|---|---|---|---|---|---|---|---|---|---|---|
| | | | | | PERFORMERS | CONTENTS | SHOP/FACILITY INFORMATION | | | PERFORMERS | CONTENTS | SHOP/FACILITY INFORMATION | | | |
| | | | | | | | SHOP/FACILITY NAME | ADDRESS | URL | | | SHOP/FACILITY NAME | ADDRESS | URL | |
| 2014/4/10 | 00000 | xxx COOKING | CULTURE | A | AA | AAA | XX SUPERMARKET | AAB | AAC | | | | | | |
| 2013/12/10 | 00010 | yyy BASEBALL | SPORTS | B | BB | BBB | YY BASEBALL FIELD | BBC | BBD | | | | | | |
| 2013/11/20 | 00000 | VARIETY SPECIAL | VARIETY | A | CC | CCC | CCA | CCB | CCD | EE | EEE | EEA | EEB | EED | |
| 2013/11/5 | 00040 | zz TRIP | VARIETY | D | DD | DDD | ZZ RESTAURANT | DDA | DDB | FF | FFF | ZZ SHOP | FFA | FFB | |
| | | | | | ... | | | | | | | | | | |

FIG.7

SEARCH RESULT USING
RECORDING LOG INFORMATION

| DESTINATION | ADDRESS | DATE AND TIME | CHANNEL | PROGRAM NAME | GENRE | PERFORMERS | CONTENTS |
|---|---|---|---|---|---|---|---|
| XX SUPERMARKET | AAB | 2014/4/10 | 00000 | xxx COOKING | CULTURE | AA | AAA |
| YY BASEBALL FIELD | BBC | 2013/12/10 | 00010 | yyy BASEBALL | SPORTS | BB | BBB |
| ZZ SHOP | FFA | 2013/11/5 | 00040 | zz TRIP | VARIETY | FF | FFF |

FIG.18

| SEARCH DATE AND TIME | SEARCH PLACE | DESTINATION | USER ID | ASSOCIATED INFORMATION 1 | | | | ASSOCIATED INFORMATION 2 | | | | |
|---|---|---|---|---|---|---|---|---|---|---|---|---|
| | | | | ASSOCIATED KEYWORDS ON ROUTE | ASSOCIATED INFORMATION ITEMS | | | ASSOCIATED KEYWORDS ON ROUTE | ASSOCIATED INFORMATION ITEMS | | | ... |
| | | | | | | ADDRESS | TELEPHONE NUMBER | | | ADDRESS | TELEPHONE NUMBER | |
| 2014/3/18 | G | GG | A | GGG | | GA | GB | GGG2 | | GA2 | GB2 | |
| 2014/3/20 | H | HH | B | HHH | | HA | HB | HHH2 | | HA2 | HB2 | |
| 2014/3/28 | I | II | A | III | | IA | IB | III2 | | IA2 | IB2 | |
| ... | | | | | | | | | | | | |

FIG.19

| DATE AND TIME | CHANNEL | PROGRAM NAME | GENRE | CONTENTS | SCENE 1 | | | SCENE 2 | | | ... |
|---|---|---|---|---|---|---|---|---|---|---|---|
| | | | | | PERFORMERS | FACILITY NAME | ADDRESS | PERFORMERS | FACILITY NAME | ADDRESS | |
| 2014/4/2 | 00010 | J | JJ | JJJ | JA, JB, JC | JJA | JJJA | JA, JB | JJB | JJJB | |
| 2014/4/8 | 00050 | K | KK | KKK | KA, KB | KKA, KKB | KKKA, KKKB | KA, KB, KC | KKC | KKKC | |
| 2014/4/21 | 00060 | L | LL | LLL | LA | LLA | LLLA | LB | LLB | LLLB | |
| ... | | | | | | | | | | | |

PROGRAM RECORDING METHOD, PROGRAM RECORDING DEVICE, DESTINATION SETTING METHOD, AND DESTINATION SETTING DEVICE

TECHNICAL FIELD

The present invention relates to a program recording method and a program recording device for recording programs, and a destination setting method and a destination setting device for setting destinations.

BACKGROUND ART

Conventionally, there is known a program recording device for recording TV broadcast programs. In the program recording device, setting in advance the broadcast date and time, and the channel of a program which the user would like to record allows for the user to reserve recording of the program. Further, there is also known a program recording device configured such that setting a certain keyword in advance allows for the user to reserve recording of a program associated with the keyword, without the need of setting the broadcast date and time, and the channel individually.

There is known an electronic program guide (EPG), which is one of the tools for TV viewing, as a technique of supporting program recording. In the electronic program guide, a list of TV broadcast programs is displayed on a screen. This makes it easy for the viewer to know when and what programs are broadcasted. Utilizing the electronic program guide makes it possible to know the information relating to programs.

It is often the case that TV programs introduce a variety of shops, facilities, travel information, sightseeing information, or local information. As a result, the places, restaurants, or hotels introduced on TV programs are often set as destinations in a car navigation device. In this case, the user is required to record on paper or memorize the places introduced on TV programs, and set the recorded or memorized places as destinations in a car navigation device when the user would like to go to the places introduced on TV programs. However, the user may forget to record the places introduced on TV programs on paper, or may take time in setting the places as destinations in a car navigation device.

For instance, patent literature 1 and patent literature 2 disclose a method, in which a keyword relating to specific position information is extracted from program information received as an electronic program guide at the time of route search in a car navigation device, and the keyword is set as a destination in the car navigation device.

Further, it is often the case that the user is interested in the shops, facilities, or sightseeing areas where the user has visited as destinations. Therefore, when these places are broadcast on TV programs, it is desirable to automatically record these places as TV programs in which the user is interested. For instance, patent literature 3 and patent literature 4 disclose a method, in which a route to a destination is searched, and a program to be recorded is determined based on information relating to the destination or information relating to the route.

However, in the conventional destination setting method utilizing an electronic program guide, it is necessary to search an intended destination from the entirety of an electronic program guide of an enormous information amount. Further, in the method for determining a recording program based on destination or route information, a program which is not necessary to be recorded may be recorded, because destination or route information of a car may be used by an unspecified family member who drives the car.

CITATION LIST

Patent Literature

Patent literature 1: Japanese Unexamined Patent Publication No. 2010-133978
Patent literature 2: Japanese Unexamined Patent Publication No. 2012-39609
Patent literature 3: Japanese Patent Publication No. 4,675,375
Patent literature 4: Japanese Patent Publication No. 4,675,376

SUMMARY OF INVENTION

A program recording method according to an aspect of the invention includes a destination setting receiving step of receiving setting of a destination by a user when a route from a present position to the destination is guided; a user judging step of judging whether the user who sets the destination is a user who performs program recording reservation; a keyword presenting step of presenting the user with a keyword for use in performing program recording reservation, based on the destination received in the destination setting receiving step, when the user is judged to be the user who performs program recording reservation in the user judging step; a keyword selection receiving step of receiving selection, by the user, of the keyword presented in the keyword presenting step; a program selecting step of selecting a program associated with the keyword selected in the keyword selection receiving step; and a recording reservation step of reserving recording of the program selected in the program selecting step.

BRIEF DESCRIPTION OF DRAWINGS

FIG. 1A is a diagram illustrating an overview of services to be provided by a car navigation system embodying the invention;

FIG. 1B is a diagram illustrating an example, in which a device manufacturer is a datacenter operating company;

FIG. 1C is a diagram illustrating an example, in which both or one of a device manufacturer and a managing company is a datacenter operating company;

FIG. 5 is a flowchart illustrating a process of setting a destination from an extracted keyword in the first embodiment;

FIG. 6 is a diagram illustrating an example of recording log information;

FIG. 7 is a diagram illustrating an example of a display screen for displaying destination candidates;

FIG. 18 is a diagram illustrating an example of destination history information representing a history on destinations set by the user; and FIG. 19 is a diagram illustrating an example of a program information table.

Figure 2:
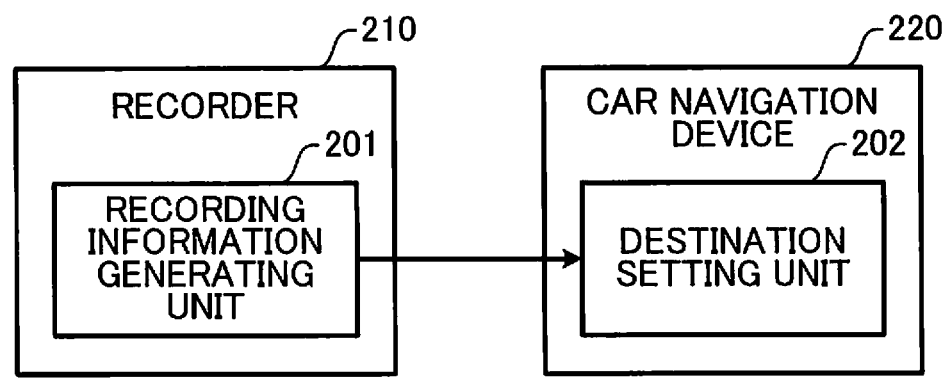
FIG. 2 is a diagram illustrating a schematic configuration of a car navigation system in a first embodiment.

DESCRIPTION OF EMBODIMENTS (Findings Based on which the Invention has been Made)

There has been studied a technique of designating a program type such as a travel program from TV program information registered in an electronic program guide, and narrowing the destinations to be set in a car navigation device. However, the electronic program guide includes information relating to TV programs of all the channels at the present time and thereafter, and information relating to TV programs in the past is discarded from the electronic program guide. Since the programs displayed on the electronic program guide are the programs to be broadcast in the future, the programs are programs that the user has not viewed.

Accordingly, a program for use in setting a destination is searched from the information relating to the programs that the user has not viewed. In this case, it is difficult to search information relating to an intended place. Further, even when a program is designated, the designated program may not include the intended place. It is possible to search a destination from the information relating to TV programs, with use of an existing electronic program guide. However, it is impossible to search a destination from the programs broadcast in the past or from the programs recorded by the user. Thus, there is a need for searching a destination from the programs broadcast in the past or from the programs recorded by the user in an easy way.

Further, there has been studied a technique of determining a program to be recorded, based on destination or route information input in a car navigation device. In this configuration, a program to be recorded is determined by searching a route to the destination. However, a car loaded with a car navigation device is not necessarily driven by a specific person. A recording process is performed by the user, no matter who is the user driving the car. Therefore, an unnecessary program may be recorded to the user who views the recorded programs. There is a need for recording a necessary program when it is necessary to do so in order to avoid recording of an unnecessary program.

Heretofore, there has not been studied a technical solution for meeting these needs.

In order to solve the above problems, the inventors have achieved the invention having the following aspects.

A program recording method according to an aspect of the invention includes a destination setting receiving step of receiving setting of a destination by a user when a route from a present position to the destination is guided; a user judging step of judging whether the user who sets the destination is a user who performs program recording reservation; a keyword presenting step of presenting the user with a keyword for use in performing program recording reservation, based on the destination received in the destination setting receiving step, when the user is judged to be the user who performs program recording reservation in the user judging step; a keyword selection receiving step of receiving selection, by the user, of the keyword presented in the keyword presenting step; a program selecting step of selecting a program associated with the keyword selected in the keyword selection receiving step; and a recording reservation step of reserving recording of the program selected in the program selecting step.

The above configuration makes it possible to perform program recording reservation, with use of a destination set by the user. Further, it is determined whether the user who sets a destination is the user who performs program recording reservation. Accordingly, when an unspecified user in the family drives a car, program recording reservation is allowed only when a specific user sets a destination. This makes it possible to prevent recording of an unnecessary program. Accordingly, it is possible to reduce the storage capacity of a recorder or reduce the number of recording programs. Further, when the user views a recorded program, the user can easily search the intended program.

Further, in the above aspect, preferably, the user judging step may include receiving input by the user as to whether program recording reservation is performed for judging whether the user is the user who performs program recording reservation.

The above configuration is advantageous in securely judging whether the user who sets a destination is the user who performs program recording reservation.

Further, in the above aspect, preferably, the user judging step may include authentication of the user by voice or image for judging whether the user is the user who performs program recording reservation.

The above configuration makes it possible to automatically judge whether the user who sets a destination is the user who performs program recording reservation, without the need of querying the user.

Further, in the above aspect, preferably, the program selecting step may include extracting, from an electronic program guide, a program associated with the keyword selected in the keyword selection receiving step, presenting the user with the extracted program, and receiving selection, by the user, of a program to be recorded from the presented programs.

According to the above configuration, a program associated with a selected keyword is extracted from the electronic program guide, the extracted program is presented to the user, and selection, by the user, of a program to be recorded from the presented program is received. Accordingly, when two or more programs are extracted as candidates of a program to be recorded, the user is allowed to record only an intended program. This makes it possible to prevent recording of an unnecessary program to the user.

Further, the program recording method may preferably further include a destination storing step of storing the destination received in the destination setting receiving step, wherein the keyword presenting step includes presenting a keyword for use in performing program recording reservation based on the destination set in the past and stored in the destination storing step, when the user is judged to be the user who performs program recording reservation in the user judging step.

According to the above configuration, program recording reservation is performed with use of a destination set in the past. This makes it possible to record a variety of types of programs in which the user is interested.

Further, in the above aspect, preferably, the keyword presenting step may include presenting a keyword for use in performing program recording reservation, based on the destination received in the destination setting receiving step, and based on information relating to areas around the destination, when the user is judged to be the user who performs program recording reservation in the user judging step.

According to the above configuration, a keyword for use in performing program recording reservation is presented, based on the received destination and based on the information relating to areas around the destination. This makes it possible to extract a keyword in a wide range with use of not only the destination but also the information relating to areas around the destination. Thus, it is possible to record a program introducing the areas around the destination.

Further, in the above aspect, the program recording method may preferably further include a program information acquiring step of acquiring program information relating to a recorded program; a program information analysis step of analyzing the program information acquired in the program information acquiring step for extracting a keyword; and a destination setting step of setting a new destination with use of the keyword extracted in the program information analysis step.

According to the above configuration, program information relating to a recorded program is acquired, the acquired program information is analyzed for extracting a keyword, and a new destination is set with use of the extracted keyword. This makes it possible to utilize the program information relating to a program recorded by the user in the past. Thus, it is possible to set a destination by narrowing the programs in which the user is interested. Further, as compared with a destination setting method using information relating to an enormous amount of programs included in an electronic program guide, the above configuration makes it possible to narrow the candidates of a destination to be set. This is advantageous in efficiently setting a destination.

Further, in the above aspect, preferably, the program information acquiring step may include acquiring program information included in an electronic program guide, or program information included in a program recorded by the user.

According to the above configuration, it is possible to set a destination, with use of program information included in an electronic program guide, or with use of program information included in a program recorded by the user.

Further, in the above aspect, preferably, the program information acquiring step may include acquiring program information which is not included in an electronic program guide, but is provided by a service provider.

According to the above configuration, it is possible to set a destination, with use of program information which is not included in an electronic program guide, but is provided by a service provider.

Further, in the above aspect, preferably, the destination setting step may include switching between an automatic setting mode of automatically setting the destination, and a manual setting mode of manually setting the destination.

According to the above configuration, switching to the automatic setting mode makes it possible to omit a user's operation of setting a destination, and switching to the manual setting mode allows the user to select a destination.

Further, in the above aspect, preferably the destination setting step may include, when a distance between a user position representing the present position of the user, and a candidate position representing a place to be specified by the keyword extracted in the program information analysis step is not larger than a predetermined threshold value in the automatic setting mode, setting the candidate position as the destination.

According to the above configuration, in the automatic setting mode, when the distance between a user position representing the present position of the user, and a candidate position representing a place to be specified by the extracted keyword is not larger than a predetermined threshold value, the candidate position is set as the destination. Accordingly, it is possible to automatically set a destination close to the present position.

Further, in the above aspect, preferably, the destination setting step may include specifying a user who sets the destination, and setting the destination only with use of a keyword extracted from program information relating to a program recorded by the specified user.

In the above configuration, the user who sets a destination is specified, and the destination is set with use of only the keyword extracted from the program information relating to a program recorded by the specified user. This makes it possible to set a destination optimum for each of the users.

Further, in the above aspect, preferably, the destination setting step may include presenting the user with a place to be specified by the keyword extracted in the program information analysis step, and receiving selection, by the user, of a place to be designated as the destination from the presented place in the manual setting mode.

According to the above configuration, in the manual setting mode, the user is presented with a place to be specified by the extracted keyword, and selection, by the user, of a place to be designated as the destination from the presented place is received. Accordingly, the user is allowed to select an intended place from the place specified based on the recorded program.

Further, in the above aspect, preferably, the destination setting step may include changing the order of the place to be presented in accordance with a travel time from the present position of the user to the place to be specified by the keyword.

According to the above configuration, the order of the place to be presented is changed in accordance with a travel time from the present position of the user to the place to be specified by the keyword. Accordingly, the user is allowed to set a destination, taking into consideration a travel time from the present position of the user to the place to be specified by the keyword.

A program recording device according to another aspect of the invention includes a destination setting receiving unit which receives setting of a destination by a user when a route from a present position to the destination is guided; a user judging unit which judges whether the user who sets the destination is a user who performs program recording reservation; a keyword extracting unit which extracts a keyword for use in performing program recording reservation, based on the destination received by the destination setting receiving unit, when the user is judged to be the user who performs program recording reservation by the user judging unit; a keyword presenting unit which presents the user with the keyword extracted by the keyword extracting unit; a keyword selection receiving unit which receives selection, by the user, of the keyword presented by the keyword presenting unit; a program selecting unit which selects a program associated with the keyword selected by the keyword selection receiving unit; and a recording reservation unit which reserves recording of the program selected by the program selecting unit.

The above configuration makes it possible to perform program recording reservation, with use of the destination set by the user. Further, it is determined whether the user who sets a destination is the user who performs program recording reservation. Accordingly, when an unspecified user in the family drives a car, program recording reservation is allowed only when a specific user sets a destination. This makes it possible to prevent recording of an unnecessary program. Accordingly, it is possible to reduce the storage capacity of a recorder or reduce the number of recording programs. Thus, it is possible to prevent shortage of the storage capacity of the recorder. Further, when the user views a recorded program, the user can easily search the intended program.

A destination setting method according to another aspect of the invention includes a program information acquiring step of acquiring program information relating to a recorded program; a program information analysis step of analyzing the program information acquired in the program information acquiring step for extracting a keyword; and a destination setting step of setting a destination when a route from a present position to the destination is guided, with use of the keyword extracted in the program information analysis step.

According to the above configuration, program information relating to a recorded program is acquired, the acquired program information is analyzed for extracting a keyword, and a destination is set with use of the extracted keyword when a route from the present position to the destination is guided. This makes it possible to utilize program information relating to a program recorded by the user in the past. Thus, the above configuration makes it possible to set a destination by narrowing the programs in which the user is interested. Further, as compared with a configuration, in which a destination is set with use of information relating to an enormous amount of programs included in an electronic program guide, the above configuration makes it possible to narrow the candidates of a destination to be set. This is advantageous in efficiently setting a destination.

A destination setting device according to yet another aspect of the invention includes a program information acquiring unit which acquires program information relating to a recorded program; a program information analysis unit which analyzes the program information acquired by the program information acquiring unit for extracting a keyword; and a destination setting unit which sets a destination when a route from a present position to the destination is guided, with use of the keyword extracted by the program information analysis unit.

According to the above configuration, program information relating to a recorded program is acquired, the acquired program information is analyzed for extracting a keyword, and a destination is set with use of the extracted keyword when a route from the present position to the destination is guided. This makes it possible to utilize the program information relating to a program recorded by the user in the past. Thus, the above configuration makes it possible to set a destination by narrowing the programs in which the user is interested. Further, as compared with a configuration, in which a destination is set with use of information relating to an enormous amount of programs included in an electronic program guide, the above configuration makes it possible to narrow the candidates of a destination to be set. This is advantageous in efficiently setting a destination.

The following embodiments are examples of the invention. The numerical values, the shapes, the constituent elements, the steps, and the order of steps described in the following embodiments are examples, and do not limit the gist of the invention. Further, among the constituent elements in the following embodiments, the constituent elements that are not described in independent claims defining the broadest scope are described as optional constituent elements. Further, it is possible to combine each of the contents in all the embodiments.

(Overview of Services to be Provided)

FIG. 1A is a diagram illustrating an overview of services to be provided by a car navigation system having a destination setting function or a program recording function in an embodiment. The car navigation system is provided with a group 100, a datacenter operating company 110, and a service provider 120.

The group 100 is, for instance, a company, a party, or a home. The scale of the group 100 does not matter. The group 100 is provided with a number of devices 101 including a device A and a device B, and a home gateway 102. The devices 101 include devices (e.g. a smartphone, a personal computer (PC), or a hard disk (HDD) recorder) connectable to the Internet, and devices disconnectable to the Internet by themselves. The group 100 may also include devices which are not connectable to the Internet by themselves, but are connectable to the Internet via the home gateway 102. Further, a user 10 uses the devices 101 in the group 100.

The datacenter operating company 110 is provided with a cloud server 111. The cloud server 111 is a virtual server connectable to a variety of devices via the Internet. The cloud server 111 mainly manages big data, which is difficult to be handled by an ordinary database management tool or the like. The datacenter operating company 110 manages data, manages the cloud server 111, and operates a datacenter which performs these services.

The datacenter operating company 110 is not limited to a company which manages data or operates the cloud server 111. For instance, as illustrated in FIG. 1B, when a device manufacturer which develops and manufactures one of the devices 101 manages data or manages the cloud server 111, the device manufacturer corresponds to the datacenter operating company 110. Further, the number of datacenter operating companies is not limited to one. For instance, as illustrated in FIG. 1C, when a device manufacturer and a managing company jointly or sharingly manage data or operate the cloud server 111, both or one of the device manufacturer and the managing company corresponds to the datacenter operating company 110.

The service provider 120 is provided with a server 121. The scale of the server 121 does not matter. For instance, the server 121 includes a memory in a PC for personal use. Further, the service provider 120 may not be provided with the server 121.

In the aforementioned service, the home gateway 102 is not an essential element. For instance, when the cloud server 111 manages all the data, the home gateway 102 is not necessary. Further, when all the devices in a house are connected to the Internet, a device disconnectable to the Internet by itself may not exist.

Next, a flow of information in the services is described.

The device A or the device B in the group 100 individually transmits log information thereof to the cloud server 111 in the datacenter operating company 110. The cloud server 111 collects the log information of the device A or of the device B (see the arrow 131 in FIG. 1A). The log information is information indicating e.g. operation conditions or operation dates and times of the devices 101. For instance, the log information includes a quantity of laundry, an opening/closing date and time of a refrigerator, the number of times of opening/closing a refrigerator, or a recording history by a recorder. The log information is not limited to these information items, and may include a variety of information items acquirable from a variety of devices. The log information may be directly provided from the devices 101 themselves to the cloud server 111 via the Internet. Further, the log information may be temporarily collected in the home gateway 102 from the devices 101, and may be provided from the home gateway 102 to the cloud server 111.

Next, the cloud server 111 in the datacenter operating company 110 provides the collected log information to the service provider 120 unit by unit. The unit may correspond to a certain amount of information, by which the datacenter operating company 110 can organize the collected information and can provide to the service provider 120, or may correspond to an amount of information required from the service provider 120. In the embodiment, the log information is provided by a unit. Alternatively, the amount of information to be provided may vary depending on a condition. The log information is stored in the server 121 owned by the service provider 120, as necessary (see the arrow 132 in FIG. 1A). The service provider 120 organizes the log information into information appropriate for the service to be provided to the user, and provides the organized information to the user.

The user to whom the services are provided may be a user 10 who uses the devices 101, or may be an external user 20.

The service providing method to the user 10, 20 may be a method, wherein the service is directly provided to the user 10, 20 from the service provider 120 (see the arrows 133 and 134 in FIG. 1A). Further, the service providing method to the user 10 may be a method, wherein the service is provided to the user 10 via the cloud server 111 in the datacenter operating company 110 (see the arrows 135 and 136 in FIG. 1A). Further, the cloud server 111 in the datacenter operating company 110 may organize the log information into information appropriate for the service to be provided to the user, and may provide the organized information to the service provider 120.

In the following embodiments, the external user 20 operates a car navigation device in a car, and sets a destination with use of log information to be provided from the service provider 120. Further, the external user 20 controls a recording device included in the devices 101 via the Internet, with use of destination information, route information, a destination history, or position information stored in the car navigation device, and records programs.

(First Embodiment)

A car navigation system in the first embodiment of the invention is described referring to the drawings.

A schematic configuration of the car navigation system in the first embodiment is described referring to FIG. 2. FIG. 2 is a diagram illustrating a schematic configuration of the car navigation system in the first embodiment. The car navigation system in the first embodiment is provided with a recorder 210 and a car navigation device 220. The recorder 210 is one of the devices 101, and is provided with a recording information generating unit 201. The recorder 210 stores TV programs in a storage medium. The storage medium may be constituted of e.g. a semiconductor memory, a magnetic disk, or an optical disc. The car navigation device 220 is provided with a destination setting unit 202.

The recording information generating unit 201 records TV programs, and transmits recording log information relating to the recorded TV programs to the server 121 in the service provider 120. After the recording log information is transmitted to the cloud server 111 via the Internet, the recording log information is provided to the server 121 in the service provider 120 from the cloud server 111. The destination setting unit 202 receives the recording log information from the server 121 in the service provider 120. The destination setting unit 202 sets a destination when a route from the present position to the destination is guided with use of information relating to a recorded program.

Figure 3:
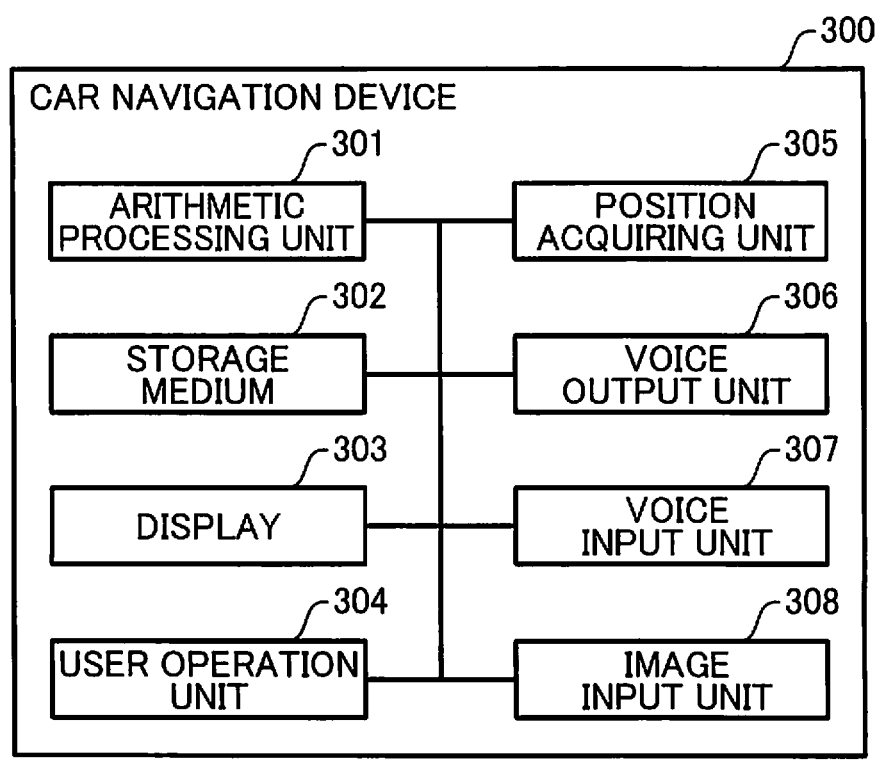
FIG. 3 is a diagram illustrating an example of a hardware configuration of the car navigation system in the first embodiment.

FIG. 3 is a diagram illustrating an example of a hardware configuration of the car navigation device in the first embodiment. A car navigation device 300 is provided with an arithmetic processing unit 301, a storage medium 302, a display 303, a user operation unit 304, a position acquiring unit 305, a voice output unit 306, a voice input unit 307, and an image input unit 308.

The arithmetic processing unit 301 controls the overall process of the car navigation device. The arithmetic processing unit 301 is implemented by e.g. a microcomputer constituted of a CPU (Central Processing Unit) which executes various codes, an ROM (Read Only Memory) for storing codes, and an RAM (Random Access Memory) to be used as a work area.

The storage medium 302 stores a map information database, information such as facility names associated with map information, or log information relating to a received recorded program for use in setting a destination. The storage medium 302 is constituted of e.g. a semiconductor memory, a magnetic disk, or an optical disc.

The display 303 includes e.g. a liquid crystal display or an organic EL display. The display 303 displays various information items such as icons, cursors, menus, windows, characters, and images (including still images and moving images). Further, the display 303 displays map information or information relating to route guide stored in the storage medium 302, or information relating to a recorded program (such as a program video, a program name, and a broadcast date and time) for use in setting a destination from the recorded program. The map information includes image data relating to maps, and information such as facility names, shop names, hotel names, restaurant names, public facility names, telephone numbers of the respective facilities, and addresses of the respective facilities. The car navigation device 300 is capable of setting a destination with use of these map information items.

The user operation unit 304 outputs, to the arithmetic processing unit 301, information input by a user's operation such as characters, numerical values, or various instructions. Examples of the user operation unit 304 are well-known various members such as press buttons/switches which detect a physical operation i.e. a pressing operation, a touch panel, a keyboard, a joystick, and a mouse.

The position acquiring unit 305 is constituted of a position information acquiring sensor such as a GPS (Global Positioning System), and acquires present position information of the car. The voice output unit 306 outputs voice information for guiding the user, voice information for setting a destination, and voice information relating to a recorded program.

The voice input unit 307 receives input of voice from the outside, when a destination is set by voice recognition or when an individual is specified by voice recognition.

The image input unit 308 photographs images in the car.

Figure 4:
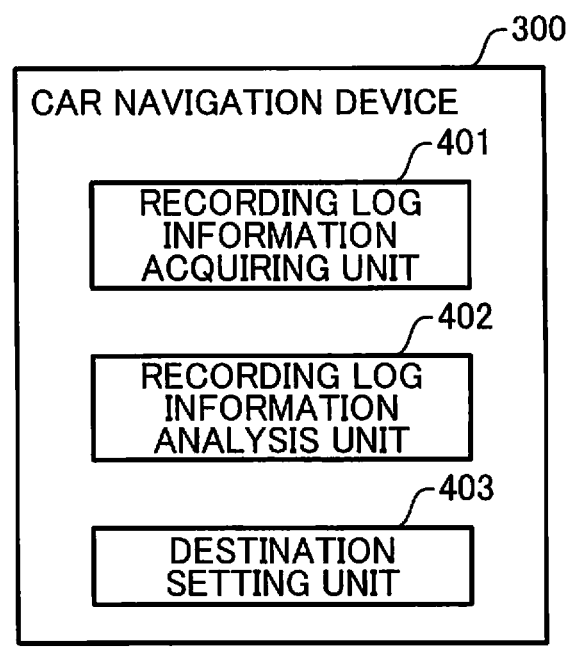
FIG. 4 is a diagram illustrating a functional configuration of a car navigation device in the first embodiment.

FIG. 4 is a diagram illustrating a functional configuration of the car navigation device in the first embodiment of the invention. The car navigation device 300 is provided with a recording log information acquiring unit 401, a recording log information analysis unit 402, and a destination setting unit 403. The recording log information acquiring unit 401, the recording log information analysis unit 402, and the destination setting unit 403 are functions to be implemented by the arithmetic processing unit 301 in the car navigation device 300 illustrated in FIG. 3.

The recording log information acquiring unit 401 acquires recording log information relating to a program recorded by an HDD recorder included in the devices 101. The recording log information acquiring unit 401 acquires program information included in an electronic program guide, as recording log information. Alternatively, the recording log information acquiring unit 401 may acquire program information to be provided by the service provider 120 (e.g. detail information such as performers or shops in a program, which is not included in an electronic program guide), as recording log information. In this way, detail information relating to a program is obtained by utilizing program information to be provided from the service provider 120. An example of the program information to be provided from the service provider 120 may be a program name, performers, a facility that appears in a program, or music broadcasted in a program, which are related to a program recorded by the user. An electronic program guide includes only the program information at the present time and thereafter. However, the information to be provided from the service provider 120 includes information relating to the programs recorded by the user in the past. The programs recorded by the user are likely to be the programs in which the user is interested. Therefore, the above configuration is advantageous in setting a destination not only from an electronic program guide but also from information relating to programs which have been recorded by the user in the past and in which the user is interested.

Further, the recording log information acquiring unit 401 may acquire program information included in a program recorded by the user, and may store the acquired program information as recording log information. Specifically, when program information including a facility name, a facility address, a channel, a program name, a program type, performers in a program, and the contents of a program is attached to the program to be broadcast, the recording log information acquiring unit 401 may acquire the program information from the recorded program.

The recording log information analysis unit 402 analyzes the recording log information acquired by the recording log information acquiring unit 401, and extracts a keyword for use in setting a destination. The keyword includes e.g. the name and address of a shop introduced in a program, the performers, the area name, or the facility name.

The destination setting unit 403 sets a destination with use of a keyword extracted by the recording log information analysis unit 402. The destination setting unit 403 switches the mode between an automatic setting mode of automatically setting a destination by a keyword, and a manual setting mode of manually setting a destination by the user.

FIG. 5 is a flowchart illustrating a process of setting a destination from an extracted keyword in the first embodiment. When a destination is set with use of recording log information, first of all, the destination setting unit 403 switches the process depending on whether the mode of setting a destination is the automatic setting mode or the manual setting mode.

First of all, the destination setting unit 403 judges whether the presently set mode is the automatic setting mode or the manual setting mode (Step S1).

Determination as to whether the automatic setting mode or the manual setting mode is used is set in advance by the user before a destination is set. The method for switching the mode between the automatic setting mode and the manual setting mode is such that a switching button is displayed on a touch panel, and an electronic operation of the displayed switching button is received for switching the mode between the automatic setting mode and the manual setting mode. Alternatively, a physical operation with respect to the switching button may be received for switching the mode between the automatic setting mode and the manual setting mode.

Further alternatively, the automatic setting mode may be set as a standard setting mode, and the destination setting unit 403 may notify the user of a place that matches with a keyword, when there is a place that matches with a keyword extracted from recording log information near the present position, regardless of whether a destination is set. When a destination is set with use of recording log information, the destination setting unit 403 may detect that the control has proceeded to a destination setting process of allowing the user to input an address, a telephone number, or a facility name. The user may be allowed to select whether a destination is set with use of the recording log information for switching the mode to the manual setting mode. The destination setting unit 403 may return the mode to the automatic setting mode, after a destination is temporarily set in the manual setting mode. This makes it possible to present information relating to a place, when there is a place that matches with a keyword extracted from recording log information near the present position when the car travels to the destination.

When it is judged that the set mode is the automatic setting mode ("AUTOMATIC SETTING MODE" in Step S1), the position acquiring unit 305 acquires present position information of the car (Step S2). The present position information is indicated by the latitude and longitude.

Subsequently, the recording log information acquiring unit 401 acquires recording log information (Step S3). FIG. 6 is a diagram illustrating an example of the recording log information. As illustrated in FIG. 6, the recording log information is stored in such a manner that the recorded date and time, the channel in which the program has been recorded, the name of the recorded program, the genre of the recorded program, the user ID for specifying the user who has recorded the program, the performers in the recorded program, the contents of the recorded program, and the shop/facility information relating to a shop or facility introduced in the recorded program are stored in association with each other. The performers, the contents of the program, and the shop/facility information are stored in association with each of the scenes in the program. Further, the shop/facility information includes the name of the shop/facility, the address of the shop/facility, and the URL (Uniform Resource Locator) of the shop/facility.

Subsequently, the recording log information analysis unit 402 extracts a keyword from the acquired recording log information (Step S4). The recording log information analysis unit 402 extracts the address of the shop/facility from the acquired recording log information as a keyword. The recording log information analysis unit 402 may extract the name of the shop/facility from the acquired recording log information as a keyword, or may extract information capable of specifying the position of a destination from the recording log information as a keyword.

Subsequently, the destination setting unit 403 judges whether there is a destination candidate near the present position (Step S5). Specifically, the destination setting unit 403 converts the address data extracted as a keyword from the recording log information into latitude and longitude data. The destination setting unit 403 judges whether there is an address satisfying a requirement such that, in a two-dimensional coordinate space represented by latitude and longitude, a Euclidean distance between the address converted into latitude and longitude data, and the present position represented by the acquired present position information is not larger than a predetermined threshold value. When it is judged that there is no destination candidate near the present position (NO in Step S5), the process is ended.

On the other hand, when it is judged that there is a destination candidate near the present position (YES in Step S5), the destination setting unit 403 displays the destination candidate on the display 303, and receives user's selection of the destination candidate to be set as a destination (Step S6). In other words, the destination setting unit 403 presents the user with information relating to a facility, when the distance between the present position of the car, and the address of the facility introduced in a recorded program is small. The information relating to a facility is a digest video, the facility name, or the performers in a scene in which the facility has been introduced in the program.

FIG. 7 is a diagram illustrating an example of a display screen for displaying destination candidates. A display screen 501 illustrated in FIG. 7 includes a digest video 502 and destination candidate information items 503.

The digest video 502 is a video obtained by editing video data including a scene in which the facility appears in a program recorded by the recorder 210. Editing the video data may be performed by one of the recorder 210, the cloud server 111 in the datacenter operating company 110, and the car navigation device 300, taking into consideration the throughput and the communication traffic volume.

The destination candidate information items 503 are information items relating to a destination candidate whose distance from the present position is judged to be not larger than a predetermined threshold value. The destination candidate information items 503 include the name and address of the destination, the recorded date and time, the channel, the program name, the program type, the performers in the program, and the contents of the program.

When there are two or more destination candidates, the destination setting unit 403 may display the destination candidates in the order of increasing the distance to the present position. Further alternatively, when there are two or more destination candidates, the destination setting unit 403 may display only a destination candidate whose distance to the present position is shortest.

Subsequently, the destination setting unit 403 sets the destination candidate selected by the user as a destination (Step S7).

In the embodiment, when it is judged that there is a destination candidate near the present position, the destination setting unit 403 displays the destination candidate. The invention is not specifically limited to the above. The destination setting unit 403 may set a destination candidate as the destination, without displaying the destination candidate. Specifically, in the automatic setting mode, the destination setting unit 403 may set a candidate position as a destination, when a distance between a user position indicating the present position of the user, and a candidate position indicating the place to be specified by the keyword extracted by the recording log information analysis unit 402 is not larger than a predetermined threshold value. Alternatively, when there are two or more destination candidates, the destination setting unit 403 may set a destination candidate closest to the present position as a destination.

On the other hand, when it is judged that the set mode is the manual setting mode ("MANUAL SETTING MODE" in Step S), the recording log information acquiring unit 401 acquires the recording log information (Step S8).

Subsequently, the recording log information analysis unit 402 extracts a plurality of keywords from the acquired recording log information (Step S9). For instance, the recording log information analysis unit 402 extracts, from the recording log information, the name of a facility introduced in a recorded program, the name of the program, the address of the facility introduced in the recorded program, the broadcast date and time of the recorded program, the performers in the recorded program, and the broadcast station (channel) by which the recorded program has been broadcast.

Subsequently, the destination setting unit 403 displays the extracted keywords on the display 303 (Step S10). In displaying the keywords, the destination setting unit 403 displays the different types of keywords such as the facility name, the program name, the facility address, the broadcast date and time, the performers, and the broadcast station in a hierarchical manner. This makes it easy to search a keyword. The destination setting unit 403 receives a user's operation with use of a touch panel of the display 303, or receives a user's operation with use of a voice recognition process for performing interactive selection of a destination from these information items. The arithmetic processing unit 301 analyzes a voice signal input to the voice input unit 307, and recognizes the vocabulary. When the recognized vocabulary matches with one of the keywords, the arithmetic processing unit 301 displays information corresponding to the matched keyword on the display 303. The cloud server 111 or the server 121 may acquire a voice signal via a network, and may perform a voice recognition process.

In this way, in the manual setting mode, the destination setting unit 403 presents the user with a place or places to be specified by the keywords extracted by the recording log information analysis unit 402, and receives user's selection of a place to be set as a destination from the presented place(s).

Figure 8:
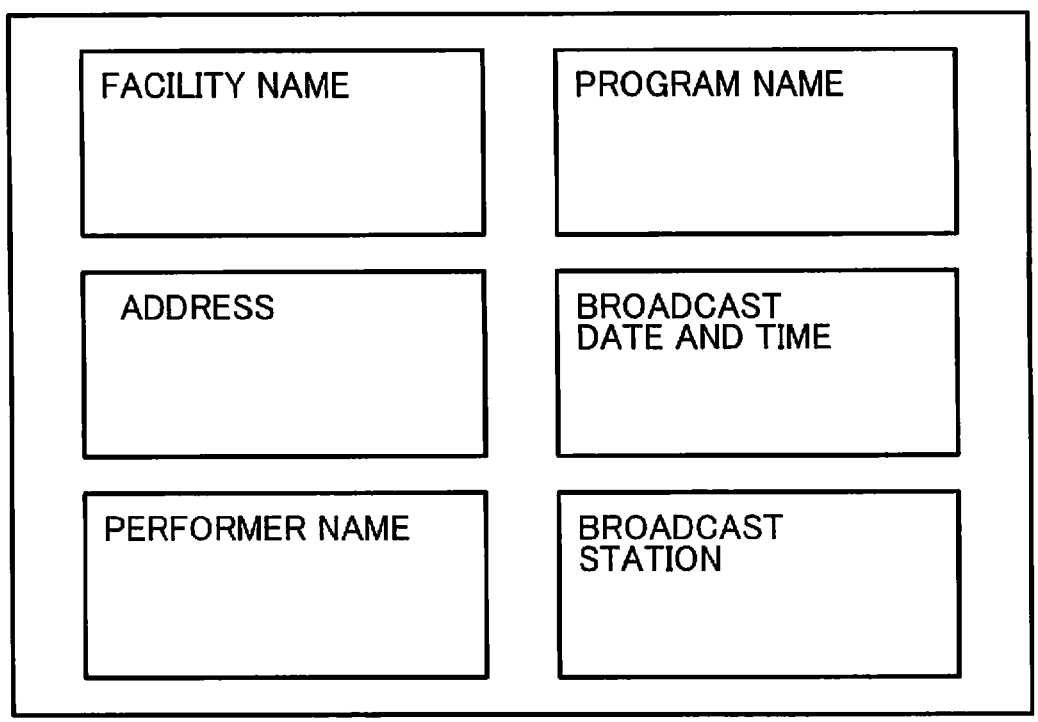
FIG. 8 is a diagram illustrating an example of a display screen on which extracted keywords are displayed in a hierarchical manner.

FIG. 8 is a diagram illustrating an example of a display screen on which the extracted keywords are displayed in a hierarchical manner. On a display screen 601 illustrated in FIG. 8, the keywords are classified into the facility name, the facility address, the performer names, the program name, the broadcast date and time, and the broadcast station. The keywords displayed on the display screen 601 is an example. Alternatively, the keywords may be classified based on information such as the day of the week when the program has been broadcast. The keywords to be displayed on the display screen 601 are selectable by a touch panel or by a voice recognition process.

Subsequently, the destination setting unit 403 displays, on the display 303, a destination candidate corresponding to one of the keywords, and receives user's selection of the destination candidate to be set as a destination (Step S11).

Figure 9:
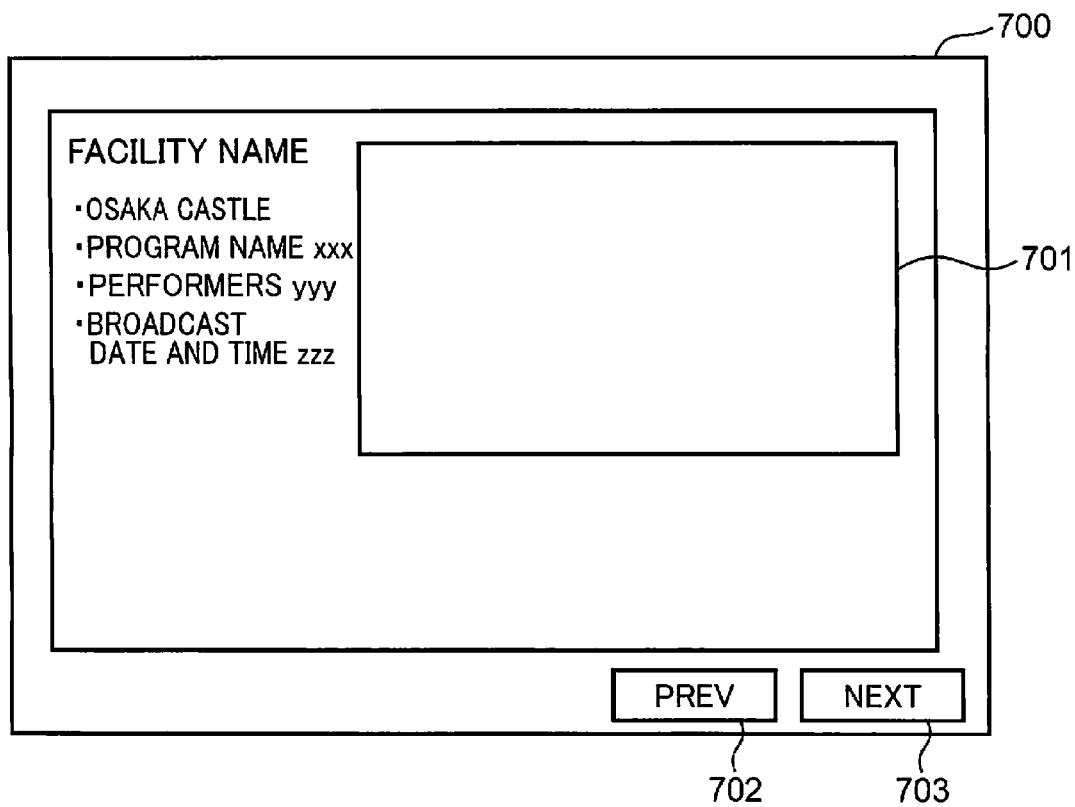
FIG. 9 is a diagram illustrating an example of a display screen to be displayed when a button representing a facility name is selected from the keywords illustrated in FIG. 8.

FIG. 9 is a diagram illustrating an example of a display screen to be displayed when a button representing the facility name is selected from the keywords illustrated in FIG. 8. On a display screen 700 illustrated in FIG. 9, there are displayed information items relating to the facility name, the program name, the broadcast date and time, and the performers. Further, on the display screen 700, there is also displayed a digest video 701 obtained by editing the contents of the recorded program. This allows for the user to easily grasp the contents of the program. Further, on the display screen 700, there are displayed icons prompting the user to shift a screen, such as a button 702 for use in displaying immediately preceding information and a button 703 for use in displaying immediately succeeding information. When the button 702 or the button 703 is pressed (touched), or when voice corresponding to the button 702 or the button 703 is detected by voice recognition, the display screen 700 is shifted to a screen which displays another information item. This makes it possible to display a plurality of destination candidates on the display 303.

Figure 10:
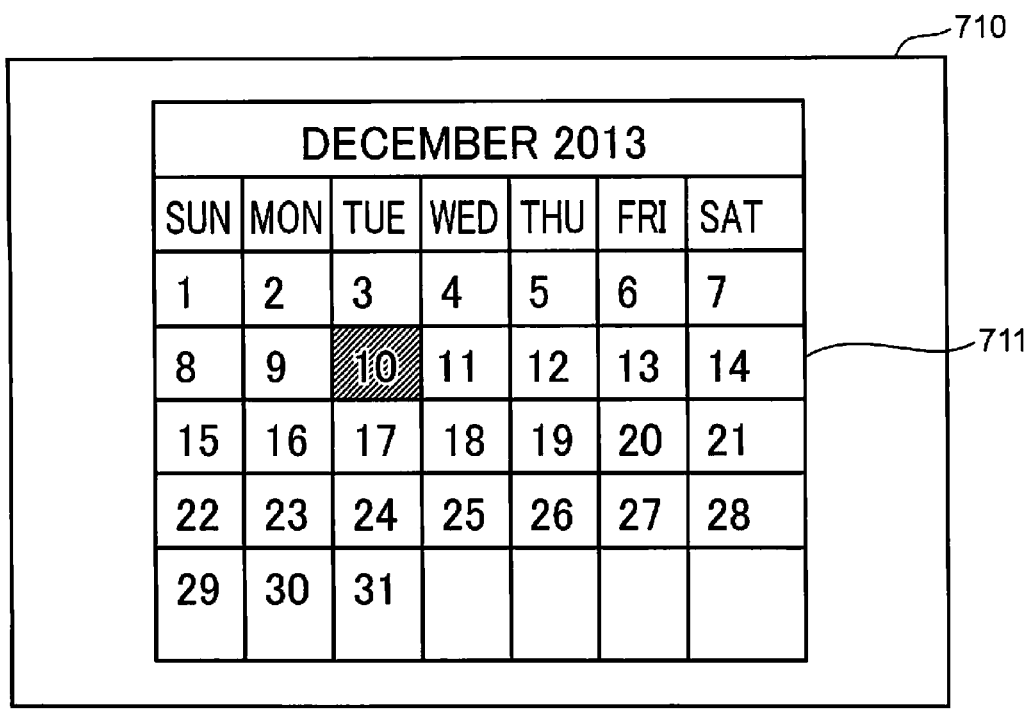
FIG. 10 is a diagram illustrating an example of a display screen to be displayed when a button representing a broadcast date and time is selected from the keywords illustrated in FIG. 8.

FIG. 10 is a diagram illustrating an example of a display screen to be displayed when a button representing the broadcast date and time is selected from the keywords illustrated in FIG. 8. On a display screen 710 illustrated in FIG. 10, there is displayed a calendar image 711 for use in selecting the broadcast date and time of a recorded program. In the calendar image 711, the display manner of the day when the recorded program is present is different from the display manner of the day when the recorded program is not present. For instance, the number representing the day and the background of the day when the recorded program is present are displayed in a reverse manner with respect to the numbers representing the days and the backgrounds of the days when the recorded program is not present. The user is allowed to select an intended year/month/day through a touch panel or by voice input.

Figure 11:
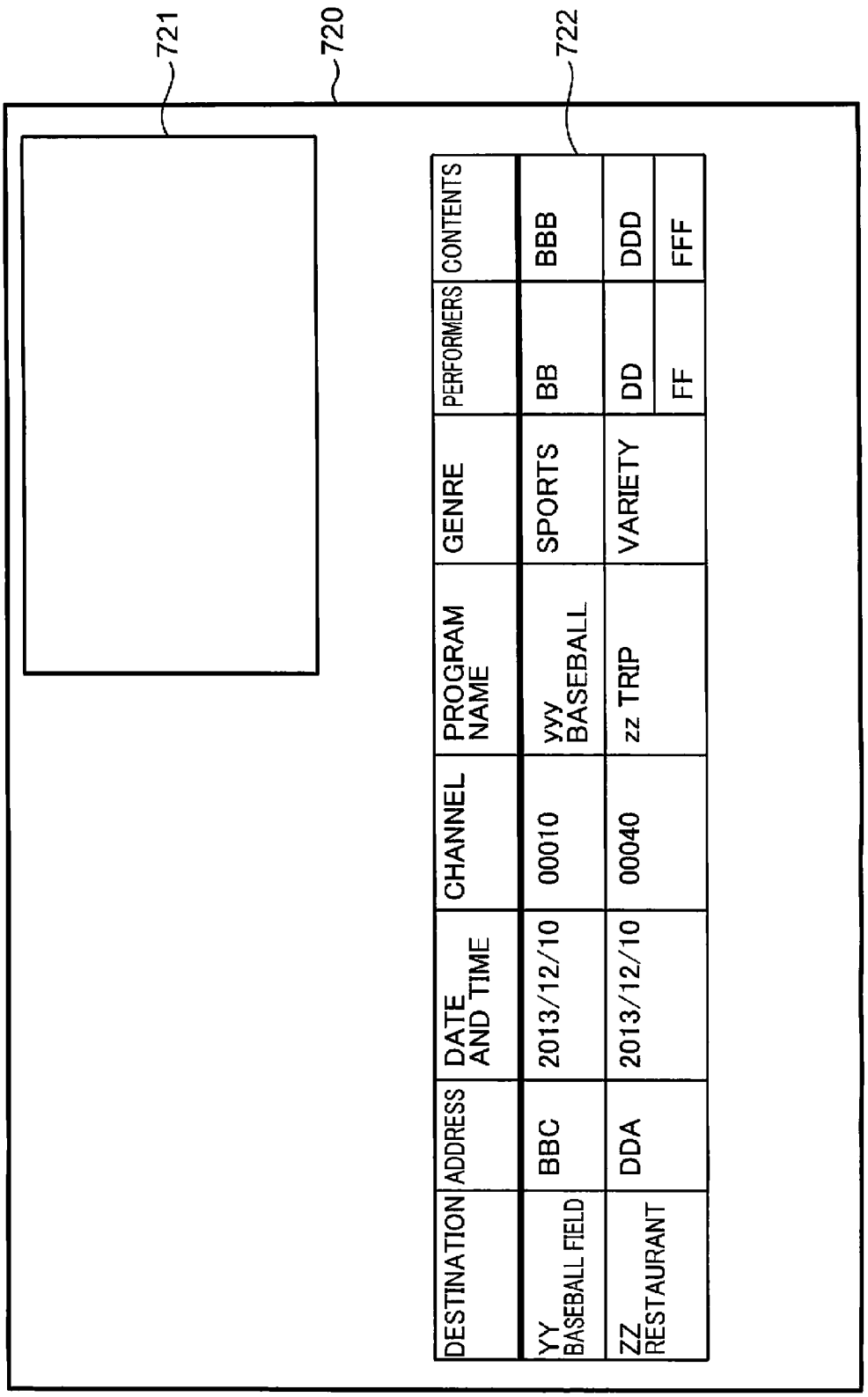
FIG. 11 is a diagram illustrating an example of a display screen to be displayed when year/month/day is selected in a calendar image illustrated in FIG. 10.

FIG. 11 is a diagram illustrating an example of a display screen to be displayed when the year/month/day is selected in the calendar image illustrated in FIG. 10. A display screen 720 illustrated in FIG. 11 includes a digest video 721 and destination candidate information items 722.

The digest video 721 is a video obtained by editing video data including a scene in which the facility appears from the program recorded by the recorder 210.

The destination candidate information items 722 are information items relating to a destination candidate, which is extracted from the recording log information, and which satisfies a requirement such that the year/month/day selected by the user and the recorded date and time match with each other. The destination candidate information items 722 include the name and address of the destination, the recorded date and time, the channel, the program name, the program type, the performers in the program, and the contents of the program.

When there are two or more destination candidates, the destination setting unit 403 may display the destination candidates in the order from the oldest recorded time. Alternatively, when there are two or more destination candidates, the destination setting unit 403 may display the destination candidates in the order from the latest recorded time.

Subsequently, the destination setting unit 403 sets the destination candidate selected by the user as a destination (Step S12).

In the first embodiment, in response to selection of a button (icon), a screen is shifted, and two or more destination candidates are individually displayed on the respective screens. The invention is not specifically limited to the above. As far as it is possible to display two or more destination candidates, the destination candidates may be displayed on one screen by using a scroll bar, without shifting the screens.

Further, the arithmetic processing unit 301 may verify pre-registered individuals by a voiceprint authentication technique, which is one of the voice recognition processes. This makes it possible to specify the user who sets a destination. When the user who is searching a destination can be specified, it is possible to acquire only the recording log information of a program or programs recorded by the specified user. This makes it possible to eliminate in advance unnecessary information when a destination is set.

Further, the destination setting unit 403 may specify the user who sets a destination, and may set a destination with use of only a keyword extracted from the program information relating to a program recorded by the specified user. In this configuration, it is possible to specify the user who sets a destination by voice authentication, fingerprint authentication, face authentication, or the like. Further, it is possible to specify the user who has reserved program recording by receiving input of the user ID when the program recording is reserved.

As described above, even if the user does not clearly remember the information such as the destination name or the performer names, tracking the information in the chronological order with use of the broadcast date and time and the like allows for the user to recall the facility that has appeared in the recorded program. The arithmetic processing unit 301 is capable of searching a route, while using the set facility as a destination for guiding the user to the destination.

The destination setting unit 403 may display a destination candidate, taking into consideration traffic jam information or traffic regulation information when the destination candidate is displayed. For instance, when two or more destination candidates are displayed, the destination setting unit 403 may display the destination candidates in the order from an earliest estimated arrival time, taking into consideration traffic jam information. The traffic jam information or traffic regulation information is included in road traffic information received from the VICS (registered trademark) (Vehicle Information and Communication System) Center, for instance, in the same manner as a well-known car navigation device. The destination setting unit 403 may use the received road traffic information.

As described above, the destination setting unit 403 may change the order of place(s) to be presented in accordance with a travel time from the present position of the user to the place specified by the keyword.

When the recorder 210 is provided with an all-program recording function of automatically recording programs of all the channels, the car navigation device 220 is also capable of utilizing recording log information of a program that has been automatically recorded in the past. Specifically, as far as the program to be used for searching a destination is a program that has been automatically recorded by the recorder 210, the destination setting unit 403 may set a destination with use of the recording log information of the automatically recorded program, despite that recording of the program is not reserved by the user. In this configuration, the destination setting unit 403 may set a destination with use of only the recording log information of a program reproduced by the user, out of the programs recorded by the all-program recording function, without using the recording log information of all the programs recorded by the all-program recording function.

Further, in the first embodiment, a car navigation device for guiding a car to a destination is described. The invention is not specifically limited to the above. As far as the device to be used by the user is a navigation device for guiding the user to a destination, the device is not limited to a car navigation device. In the above configuration, the navigation device is constituted of a terminal device such as a smartphone or a tablet computer, and is communicatively connected to a recorder via a network.

Further, in the first embodiment, the car navigation device 300 is provided with the recording log information acquiring unit 401, the recording log information analysis unit 402, and the destination setting unit 403. The invention is not specifically limited to the above. A recorder for recording programs may be provided with at least one of the recording log information acquiring unit 401, the recording log information analysis unit 402, and the destination setting unit 403. Further, the server 121 may be provided with at least one of the recording log information acquiring unit 401, the recording log information analysis unit 402, and the destination setting unit 403.

According to the destination setting method in the first embodiment, a destination candidate is recommended with use of the information attached to a program recorded by the user. This makes it possible to set a destination while narrowing the programs in which the user is interested, because information relating to a program or programs recorded by the user in the past is used, unlike a conventional destination setting method using only an electronic program guide. Further, unlike a configuration, in which a destination is set with use of information relating to an enormous amount of programs included in an electronic program guide, the above configuration makes it possible to narrow the candidates of a destination to be set. This is advantageous in efficiently setting a destination.

Second Embodiment

Figure 12:
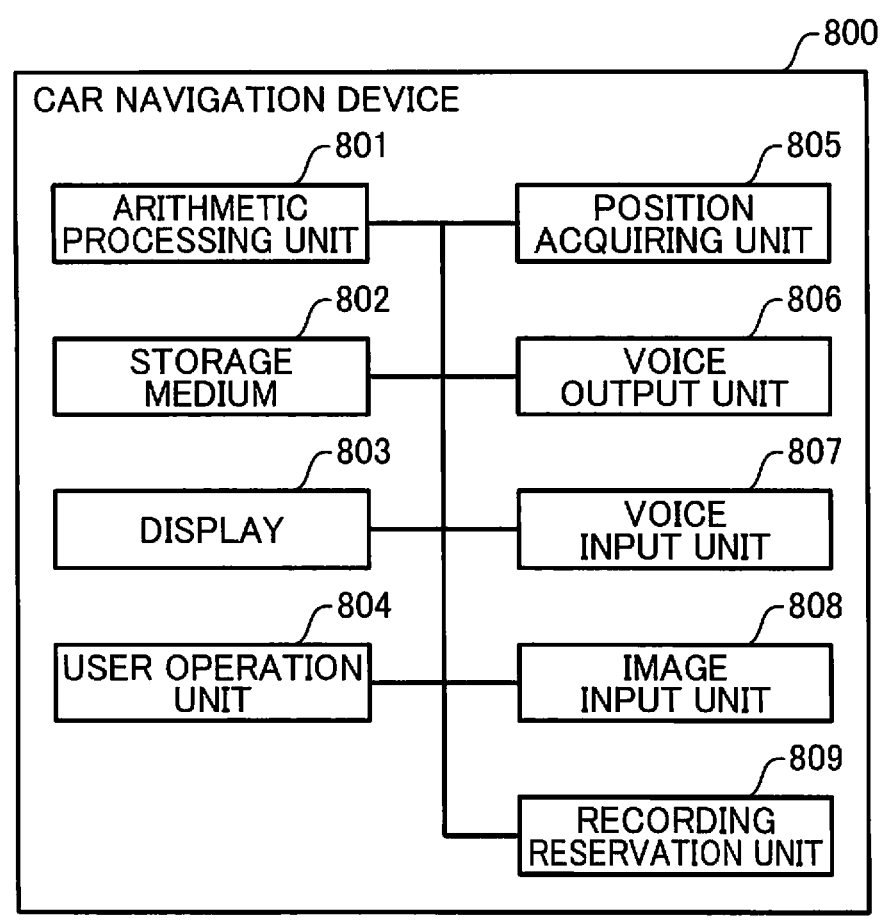
FIG. 12 is a diagram illustrating an example of a hardware configuration of a car navigation device in a second embodiment.

A car navigation system according to the second embodiment of the invention is described referring to the drawings. FIG. 12 is a diagram illustrating an example of a hardware configuration of a car navigation device in the second embodiment.

A car navigation device 800 in the second embodiment is provided with an arithmetic processing unit 801, a storage medium 802, a display 803, a user operation unit 804, a position acquiring unit 805, a voice output unit 806, a voice input unit 807, an image input unit 808, and a recording reservation unit 809.

The arithmetic processing unit 801 controls the overall process of the car navigation device. The arithmetic processing unit 801 is implemented by e.g. a microcomputer constituted of a CPU which executes various codes, an ROM (Read Only Memory) for storing codes, and an RAM (Random Access Memory) to be used as a work area.

The storage medium 802 stores a map information database, information such as facility names associated with map information, voice information or image information for specifying the user, or a feature amount for use in performing a verification process based on extracted voice or image.

The display 803 includes a liquid crystal display or an organic EL display, for instance. The display 803 displays various information items such as icons, cursors, menus, windows, characters, and images (including still images and moving images). Further, the display 803 displays map information or information relating to route guide stored in the storage medium 802. The map information includes image data relating to maps, and information such as facility names, shop names, hotel names, restaurant names, public facility names, telephone numbers of the respective facilities, and addresses of the respective facilities.

The user operation unit 804 outputs, to the arithmetic processing unit 801, information input by a user's operation such as characters, numerical values, or various instructions. Examples of the user operation unit 804 are well-known various members such as press buttons/switches which detect a physical operation i.e. a pressing operation, a touch panel, a keyboard, a joystick, and a mouse.

The position acquiring unit 805 is constituted of a position information acquiring sensor such as a GPS, and acquires present position information of the car. The voice output unit 806 outputs voice information for guiding the user, and voice information for setting a destination.

The voice input unit 807 receives input of voice from the outside, when a destination is set by voice recognition or when the user is specified by voice recognition.

The image input unit 808 photographs images (including still images and moving images) in the car. The image input unit 808 photographs an image (such as the face, the fingerprint, or a gesture) of the user who has set a destination in order to perform a personal verification process.

The recording reservation unit 809 searches candidates of a program whose recording is reserved, from keyword information associated with a destination or a route, and information of an electronic program guide, and outputs a search result on the display 803 or through the voice output unit 806, when a destination is set in the car navigation device 800. The user is allowed to designate a program to be recorded, out of the candidates of the program whose recording is reserved, by the user operation unit 804 or by the voice input unit 807. The recording reservation unit 809 transmits the information for specifying the designated program to a recorder (not illustrated) via a network, and reserves recording of the program designated by the user, based on the received information for specifying the program.

Figure 13:
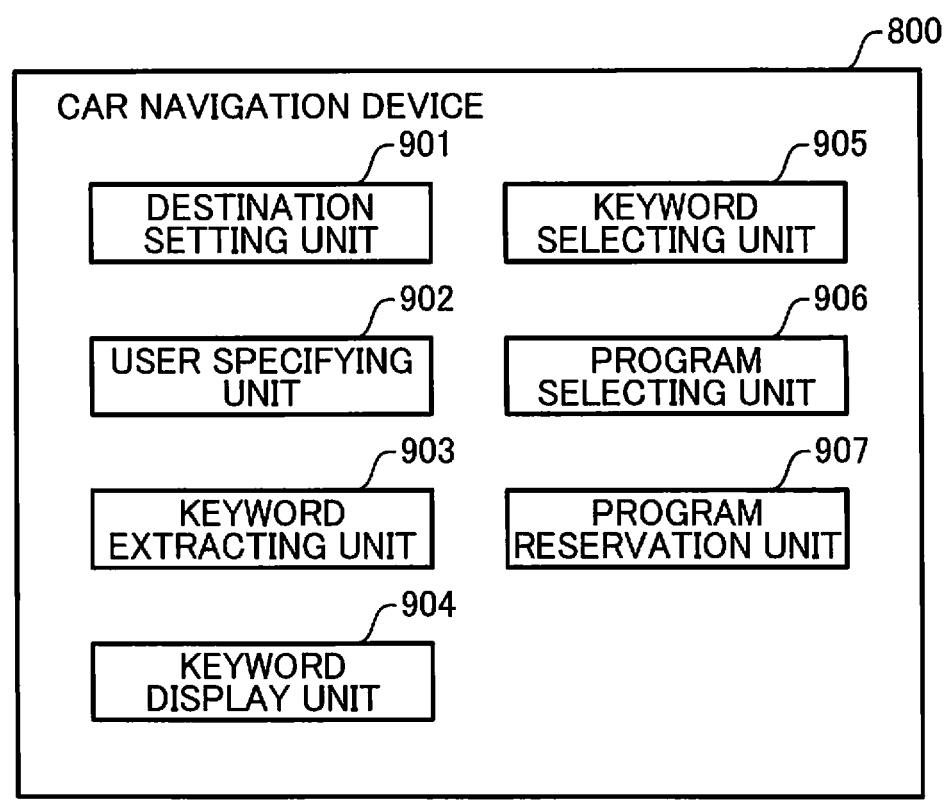
FIG. 13 is a diagram illustrating a functional configuration of the car navigation device in the second embodiment.

FIG. 13 is a diagram illustrating a functional configuration of the car navigation device in the second embodiment of the invention. The car navigation device 800 is provided with a destination setting unit 901, a user specifying unit 902, a keyword extracting unit 903, a keyword display unit 904, a keyword selecting unit 905, a program selecting unit 906, and a program reservation unit 907. The destination setting unit 901, the user specifying unit 902, the keyword extracting unit 903, the keyword display unit 904, the keyword selecting unit 905, and the program selecting unit 906 are functions to be implemented by the arithmetic processing unit 801 in the car navigation device 800 illustrated in FIG. 12. The program reservation unit 907 is a function to be implemented by the recording reservation unit 809 in the car navigation device 800 illustrated in FIG. 12.

The destination setting unit 901 receives setting of a destination by the user, and sets the received destination in a guiding unit (not illustrated) for guiding the car to the destination, when a route from the present position to the destination is guided. A destination setting method may be a well-known method. For instance, the destination setting unit 901 searches a destination candidate or candidates, based on a keyword such as the facility name, the telephone number, or the address input by the user, presents the user with the searched destination candidate or candidates, and receives user's destination designation from the presented destination candidate(s). Further, for instance, the destination setting unit 901 searches a facility or facilities near the present position as a destination candidate or candidates, with use of present position information, presents the user with the searched destination candidate or candidates, and receives user's destination designation from the presented destination candidate(s). When the destination is set, the guiding unit searches a route from the present position to the destination, and guides the user along the searched route.

The user specifying unit 902 judges whether the user who has set a destination is the user who performs program recording reservation. The judging method may include a designation method by the user, and an automatic judging method by a device. In the former method, for instance, the user specifying unit 902 directly queries the user whether the user is the user who performs program recording reservation by the display 803 or by the voice output unit 806. Thereafter, the user specifying unit 902 receives input as to whether program recording reservation is performed by the user operation unit 804 or by the voice input unit 807. According to the above configuration, the user specifying unit 902 specifies whether the user who sets a destination is the user who performs program recording reservation.

Figure 14:
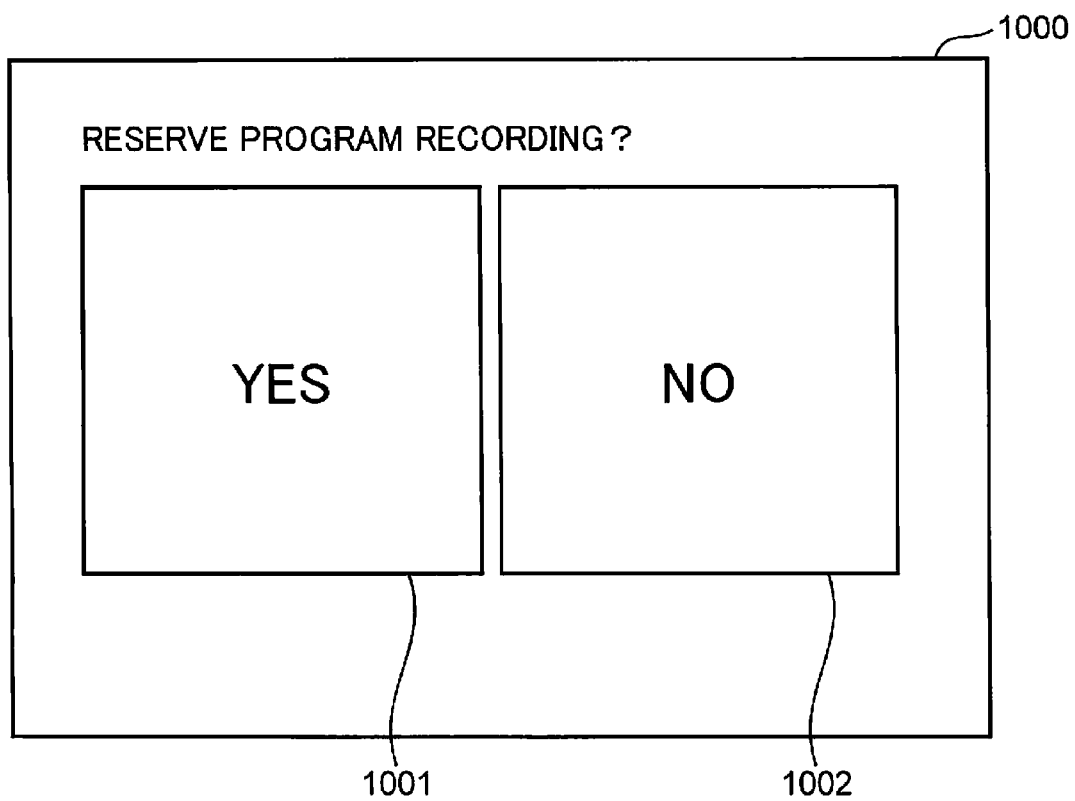
FIG. 14 is a diagram illustrating an example of a display screen to be displayed on a display when the user is queried whether the user who sets a destination is the user who performs program recording reservation.

FIG. 14 is a diagram illustrating an example of a display screen to be displayed on a display when the user is queried as to whether the user who sets a destination is the user who performs program recording reservation. On a display screen 1000, there are displayed a text representing a query to the user as to whether the user intends to perform program recording reservation, a selection button 1001 to be selected when program recording reservation is performed, and a selection button 1002 to be selected when program recording reservation is not performed. The user designates his or her intention by way of the displayed selection button 1001 or 1002 with use of the user operation unit 804. According to the above configuration, the user specifying unit 902 specifies whether the user who sets a destination is the user who performs program recording reservation.

As described above, the user specifying unit 902 may receive user's input as to whether the user performs program recording reservation for judging whether the user is the user who performs program recording reservation.

On the other hand, in the latter method, the user specifying unit 902 performs user authentication by voice recognition or image recognition in order to automatically determine whether the user who sets a destination is the user who performs program recording reservation. In this configuration, the user specifying unit 902 stores in advance identification information for identifying the user who performs program recording reservation. The identification information is voice information or image information for identifying the user, or feature amount information which has undergone a filter process (e.g. information obtained by subjecting a voice signal or an image signal to a differentiation filter process) for use in a user authentication process. The user specifying unit 902 automatically determines whether the user who sets a destination is the user who performs program recording reservation by voiceprint authentication by voice. Further, the user specifying unit 902 automatically determines whether the user who sets a destination is the user who performs program recording reservation by face authentication using an image, fingerprint authentication, gesture authentication, or the like. The user authentication process may be performed by a well-known method. The user specifying unit 902 obtains a square error between the feature amount of a newly input user, and the feature amount of each of the users registered in advance, and determines that the user who sets a destination is a registered user, when the minimum value of the obtained square errors is smaller than a threshold value.

In this way, the user specifying unit 902 may judge whether the user is the user who performs program recording reservation by performing authentication of the user by voice or image.

When the user specifying unit 902 judges that the user is the user who performs program recording reservation, the keyword extracting unit 903 extracts a keyword for use in performing program recording, based on the destination received by the destination setting unit 901. When the user specifying unit 902 judges that the user is the user who performs program recording reservation, the keyword extracting unit 903 may extract a keyword for use in performing program recording reservation, based on the destination received by the destination setting unit 901 and information relating to areas around the destination.

The keyword extracting unit 903 extracts a keyword (such as a facility name, an address, or information on a facility nearby) associated with a destination or associated with a route to the destination. The keyword extracting unit 903 extracts destination name information or facility name information on a facility present on the route to the destination, and information (such as the address or phone number) associated with the facility. The keyword extraction method may include a method, in which the name of a facility and a keyword associated with the facility are stored in advance in the storage medium 802 in association with each other, and the keyword associated with the set facility is used as an extraction result. Alternatively, the keyword extracting unit 903 may search a word or phrase associated with a facility (destination) using the Internet, and may use the search result as a keyword.

For instance, when the destination is "OSAKA CASTLE", "OSAKA CASTLE PARK" near the Osaka Castle, and "HIDEYOSHI TOYOTOMI", who is a person associated with the Osaka Castle are registered in advance as keywords. The keywords are information items for use in performing program recording reservation. Accordingly, it is desirable for the keyword extracting unit 903 to extract keywords as many as possible so that the keywords cover the keywords described in an electronic program guide.

Figure 15:
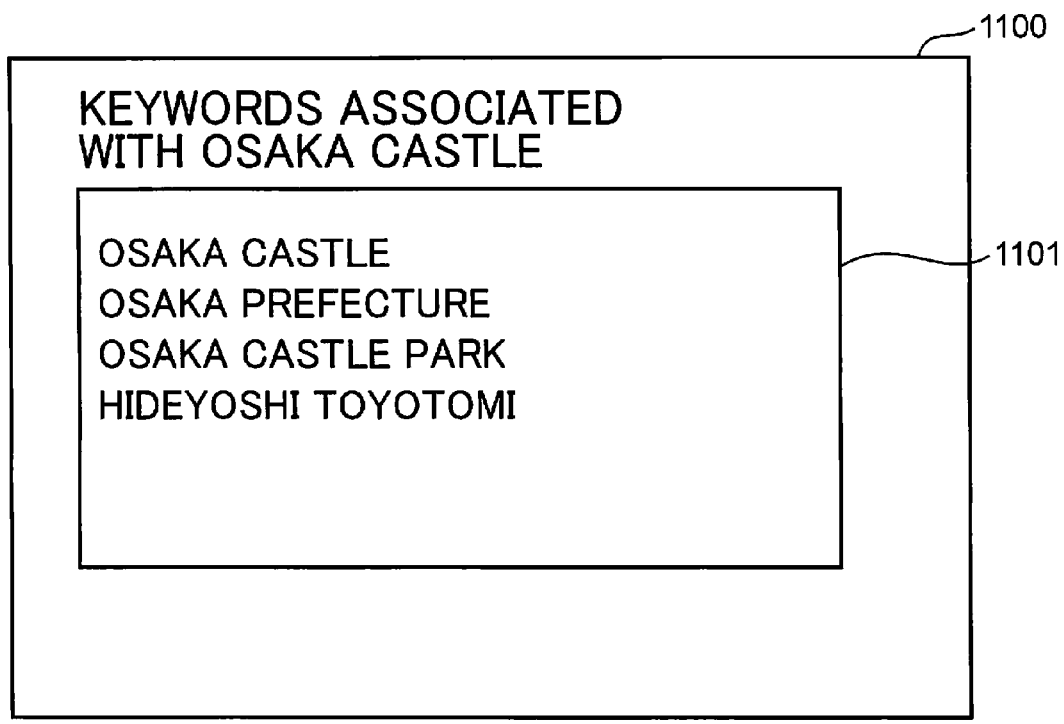
FIG. 15 is a diagram illustrating an example of a display screen for displaying keywords extracted by a keyword extracting unit.

The keyword display unit 904 displays the keywords extracted by the keyword extracting unit 903 on the display 903. FIG. 15 is a diagram illustrating an example of a display screen on which the keywords extracted by the keyword extracting unit 903 are displayed. For instance, when "OSAKA CASTLE" is set as a destination, a display screen 1100 illustrated in FIG. 11 is displayed. As illustrated in FIG. 11, the keyword extracting unit 903 extracts "OSAKA CASTLE", "OSAKA PREFECTURE", "OSAKA CASTLE PARK", and "HIDEYOSHI TOYOTOMI", as keywords 1101 associated with "OSAKA CASTLE". The keyword display unit 904 displays the extracted keywords 1101 on the display screen 1100. In this way, the keyword display unit 904 presents the user with the keywords extracted by the keyword extracting unit 903.

The keyword selecting unit 905 receives user's selection of a keyword presented by the keyword display unit 904. When the keyword selecting unit 905 receives user's input, the keyword selecting unit 905 selects a keyword displayed by the keyword display unit 904. The keyword is designated by the user operation unit 804. Alternatively, a keyword may be input by voice through the voice input unit 807, the input voice may be subjected to a well-known voice recognition process by the arithmetic processing unit 801 or by the server, and a keyword that matches with the keyword input by voice may be selected. The keyword selecting unit 905 may select two or more keywords.

The program selecting unit 906 selects a program or programs associated with the keyword selected by the keyword selecting unit 905. The program selecting unit 906 extracts, from the electronic program table, a program or programs associated with the keyword selected by the keyword selecting unit 905, presents the user with the extracted program or programs, and receives user's selection of the program to be recorded from the presented program(s).

The program selecting unit 906 extracts, from the electronic program table, a program associated with the keyword selected by the keyword selecting unit 905. The program selecting unit 906 displays the extracted program as a candidate of a program to be recorded, and receives user's input for determining a program whose recording is reserved. The program selecting unit 906 extracts a program, in which a word or phrase included in the electronic program table matches with the designated keyword, and determines that the extracted program is a candidate of a program whose recording is reserved.

Figure 16:
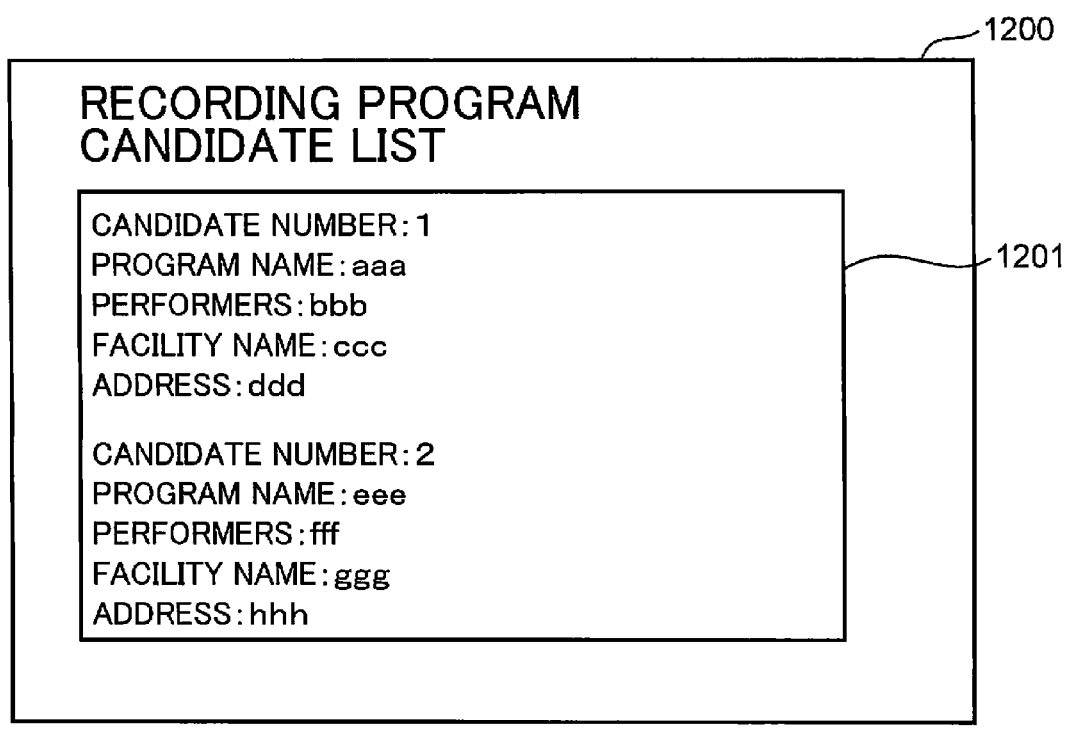
FIG. 16 is a diagram illustrating an example of a display screen for displaying candidates of a program whose recording is reserved.

FIG. 16 is a diagram illustrating an example of a display screen for displaying candidates of a program whose recording is reserved. As illustrated in FIG. 16, a recording program candidate list 1201 including program candidate numbers, and information (a program name, performers, a facility name, and a facility address) relating to a program is displayed on a display screen 1200. The user is allowed to select a program whose recording is reserved from the extracted candidates of a program whose recording is reserved. The program whose recording is reserved is directly selected by the user operation unit 804. Alternatively, a program whose recording is reserved may be selected by recognizing the voice input through the voice input unit 807. Specifically, a program name or a program candidate number is input by voice through the voice input unit 807, a well-known voice recognition process is performed by the arithmetic processing unit 801 or by the server, and a program that matches with the program name or with the program candidate number input by voice is selected.

In the second embodiment, the program selecting unit 906 displays a program associated with a keyword selected by the keyword selecting unit 905, as a candidate of a program whose recording is reserved, and selection of the program by the user is received for determining a program whose recording is reserved. The invention is not specifically limited to the above. The program selecting unit 906 may determine a program associated with a keyword selected by the keyword selecting unit 905, as a program whose recording is reserved. Specifically, the program selecting unit 906 may determine a program associated with a keyword, as a program whose recording is reserved, without displaying a candidate of the program whose recording is reserved. In this case, it is not necessary for the user to check the candidate of the program whose recording is reserved. This makes it possible to omit a user's operation of selecting a program whose recording is reserved.

The program reservation unit 907 reserves recording of the program selected by the program selecting unit 906 with respect to a recorder. When it is possible to reserve recording of a designated program, the recorder reserves recording of the program, and transmits program recording reservation completion to the car navigation device 800 via a network. The display 803 or the voice output unit 806 in the car navigation device 800 notifies the user of program recording reservation completion. Further, when it is impossible to reserve recording of a designated program due to storage capacity insufficiency or the like, the recorder transmits recording reservation disablement of the program to the car navigation device 800. Also in this case, the display 803 or the voice output unit 806 in the car navigation device 800 notifies the user of program recording reservation disablement.

Figure 17:
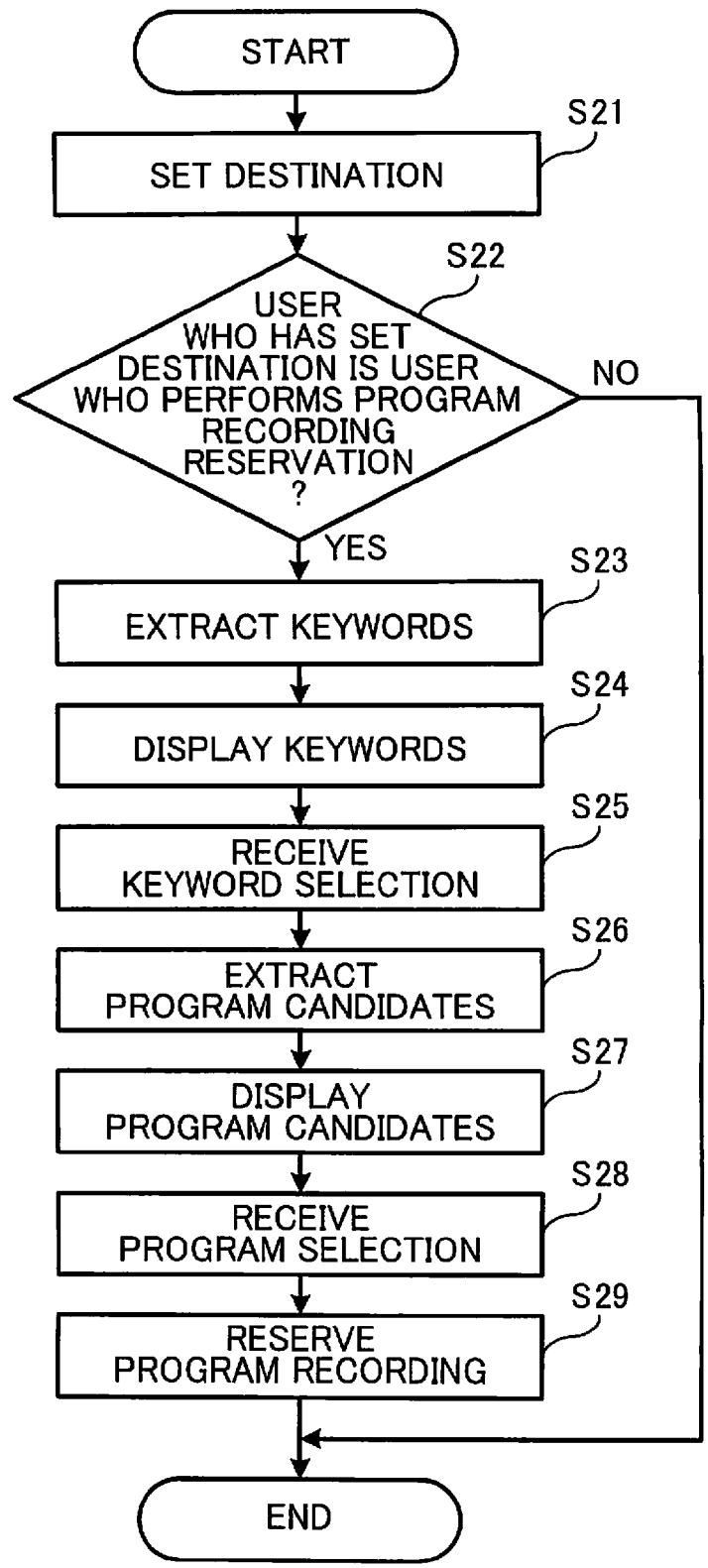
FIG. 17 is a flowchart illustrating a program recording process to be performed by the car navigation device in the second embodiment.

FIG. 17 is a flowchart illustrating a program recording reservation process to be performed by the car navigation device in the second embodiment.

The program recording process includes a destination setting process (Step S21), a user specifying process (Step S22), a keyword extracting process (Step S23), a keyword display process (Step S24), a keyword selecting process (Step S25), a program selecting process (Step S26), and a program recording reservation process (Step S27).

First of all, the destination setting unit 901 receives input of a destination by the user, and sets the destination (Step S21).

Subsequently, the user specifying unit 902 determines whether the user who has set a destination is the user who performs program recording reservation. The user specifying unit 902 switches the process based on whether the user who has set a destination is the user who performs program recording reservation. When it is judged that the user who has set a destination is the user who does not perform program recording reservation (NO in Step S22), the program recording process is ended.

On the other hand, when it is judged that the user who has set a destination is the user who performs program recording reservation (YES in Step S22), the keyword extracting unit 903 extracts a keyword for use in program recording reservation (Step S23).

Subsequently, the keyword display unit 904 displays the keyword extracted by the keyword extracting unit 903, and presents the user with the keyword (Step S24).

Subsequently, the keyword selecting unit 905 receives user's selection of the keyword displayed on the keyword display unit 904 (Step S25).

Subsequently, the program selecting unit 906 extracts a program candidate associated with the keyword selected by the keyword selecting unit 905 from the program information such as an electronic program guide (Step S26).

Subsequently, the program selecting unit 906 displays the extracted program candidate on the display 803 (Step S27).

Subsequently, the program selecting unit 906 receives user's selection of the displayed program candidate (Step S28).

Subsequently, the program reservation unit 907 reserves recording of the program selected by the user (Step S29). When the above operation is performed, the program reservation unit 907 transmits, to the recorder, program specifying information for specifying a program whose recording is reserved. The recorder reserves recording of the program to be specified by the program specifying information. Examples of the program specifying information include the program name, the broadcast date and time, and the channel. The program reservation unit 907 presents whether program recording reservation has succeeded with use of the display 803 or the voice output unit 806.

When the recorder is provided with an all-program recording function of automatically recording programs of all the channels, the program selecting unit 906 may select a recorded program from the programs stored in the recorder, when a program whose recording is reserved is selected from the program information such as an electronic program guide. This makes it possible to select a program in the past, whose recording had not been reserved at the time when the program was broadcast, with use of information such as a destination. This makes it possible to view the program afterwards.

Further, in the second embodiment, a car navigation device for guiding a car to a destination is described. The invention is not specifically limited to the above. The invention is not limited to a car navigation device, as long as the device is a navigation device for guiding the user to a destination. In the above configuration, the navigation device is constituted of a terminal device such as a smartphone or a tablet computer, and is communicatively connected to a recorder via a network.

Further, in the second embodiment, the car navigation device 800 is provided with the destination setting unit 901, the user specifying unit 902, the keyword extracting unit 903, the keyword display unit 904, the keyword selecting unit 905, the program selecting unit 906, and the program reservation unit 907. The invention is not specifically limited to the above. The recorder for recording programs may be provided with at least one of the destination setting unit 901, the user specifying unit 902, the keyword extracting unit 903, the keyword display unit 904, the keyword selecting unit 905, the program selecting unit 906, and the program reservation unit 907. Further alternatively, the server 121 may be provided with at least one of the destination setting unit 901, the user specifying unit 902, the keyword extracting unit 903, the keyword display unit 904, the keyword selecting unit 905, the program selecting unit 906, and the program reservation unit 907.

According to the program recording method in the second embodiment, program recording reservation is performed, with use of information relating to a destination set by the user (information relating to the destination or relating to a route to the destination). When the above operation is performed, it is determined whether the user who has set a destination is the user who performs program recording reservation. According to the above configuration, when an unspecified user in the family drives a car, program recording reservation is allowed only when a specific user sets a destination. This makes it possible to prevent recording of an unnecessary program. According to the program recording method in the second embodiment, it is possible to reduce the storage capacity of a recorder or reduce the number of recording programs. Thus, it is possible to prevent shortage of the storage capacity of the recorder. Further, when the user views a recorded program, the user can easily search the intended program.

When a destination is set by the user, program recording reservation may be performed with use of a destination set in the past, in addition to the set destination, in place of performing program recording reservation with use of only the set destination.

In view of the above, in the following, a program recording method with use of a destination set in the past by the user is described.

FIG. 18 is a diagram illustrating an example of destination history information representing a history of destinations set by the user.

As illustrated in FIG. 18, the destination history information includes the search date and time when a destination was searched by the user, the search place indicating a place where the destination was searched by the user, the destination set by the user, the user ID for identifying the user, and associated information associated with the destination. Further, the associated information includes an associated keyword on the route from the present position to the destination, the address of the destination, and the telephone number of the destination. Further, the associated keyword includes the name of a facility on the route. The destination history information is stored in the storage medium 802. The destination setting unit 901 stores received destinations in the storage medium 802.

First of all, the destination setting unit 901 receives user's input of a destination, and sets the destination.

Subsequently, the user specifying unit 902 specifies the user ID of the user who has set the destination. The user specifying unit 902 receives input of the user ID of the user who has set the destination. The user specifying unit 902 may specify the user by image authentication or voice authentication, and acquire the user ID of the specified user.

Subsequently, the keyword extracting unit 903 extracts a destination, an associated keyword on the route, the address of the destination, and the telephone number of the destination, as keywords for use in performing program recording reservation, from the record in which the user ID specified by the user specifying unit 902 matches with the user ID in the destination history information. When the user specifying unit 902 judges that the user is the user who performs program recording reservation, the keyword extracting unit 903 extracts a keyword for use in performing program recording reservation based on a destination in the past.

Subsequently, the keyword display unit 904 displays the keywords extracted by the keyword extracting unit 903, and presents the user with the keywords.

Subsequently, the keyword selecting unit 905 receives user's selection of a keyword displayed by the keyword display unit 904.

Subsequently, the program selecting unit 906 extracts, from a program information table, a program candidate associated with the keyword selected by the keyword selecting unit 905.

FIG. 19 is a diagram illustrating an example of the program information table. The program information table illustrated in FIG. 19 includes information relating to the programs to be broadcast after the present time, and stores the broadcast dates and times of the programs, the channels, the program names, the program genres, the contents of the programs, the performers in the programs, the names of the facilities to be introduced in the programs, and the addresses of the facilities to be introduced in the programs in association with each other. The performers, and the names and addresses of the facilities to be introduced in the programs are stored with respect to each of the scenes in each of the programs.

When the recorder is provided with an all-program recording function of automatically recording programs of all the channels, the program information table may not only include the information relating to the programs to be broadcast after the present time, but may also include information relating to the programs that have not been viewed out of the already recorded programs.

Subsequently, the program selecting unit 906 displays the extracted program candidates on the display 803. When the above operation is performed, the program selecting unit 906 creates and displays a recording program candidate list 1201 (see FIG. 16), in which the program names, the performers, the facility names, and the facility addresses in the extracted program candidates are listed.

Subsequently, the program selecting unit 906 receives user's selection of a displayed program candidate.

Subsequently, the program reservation unit 907 reserves recording of the program selected by the user.

In this way, program recording reservation is performed with use of a destination set in the past in the car navigation device. This makes it possible to record a variety of types of programs in which the user is interested.

Further, the first embodiment and the second embodiment may be combined. In the above configuration, after a user's setting of a destination is received, and program recording reservation is performed with use of the received destination, program information relating to a recorded program is acquired, the program information is analyzed for extracting a keyword, and a new destination is set with use of the extracted keyword.

INDUSTRIAL APPLICABILITY

The program recording method and the program recording device of the invention are capable of performing program recording reservation with use of a destination set by the user, and are useful as a program recording method and a program recording device for performing program recording reservation. Further, the destination setting method and the destination setting device of the invention are capable of setting a destination by narrowing the programs in which the user is interested, and are useful as a destination setting method and a destination setting device for setting a destination.

The invention claimed is:

1. A program recording method, comprising:
a destination setting receiving step of receiving setting of a destination by a user when a route from a present position to the destination is guided;
a user judging step of judging whether the user who sets the destination is a user who performs program recording reservation;
a keyword presenting step of presenting the user with a keyword for use in performing program recording reservation, based on the destination received in the destination setting receiving step, when the user is judged to be the user who performs program recording reservation in the user judging step;
a keyword selection receiving step of receiving selection, by the user, of the keyword presented in the keyword presenting step;
a program selecting step of selecting a program associated with the keyword selected in the keyword selection receiving step; and
a recording reservation step of reserving recording of the program selected in the program selecting step.

2. The program recording method according to claim 1, wherein
the user judging step includes receiving input by the user as to whether program recording reservation is performed for judging whether the user is the user who performs program recording reservation.

3. The program recording method according to claim 1, wherein
the user judging step includes authentication of the user by voice or image for judging whether the user is the user who performs program recording reservation.

4. The program recording method according to claim 1, wherein
the program selecting step includes extracting, from an electronic program guide, a program associated with the keyword selected in the keyword selection receiving step, presenting the user with the extracted program, and receiving selection, by the user, of a program to be recorded from the presented program.

5. The program recording method according to claim 1, further comprising:
a destination storing step of storing the destination received in the destination setting receiving step, wherein
the keyword presenting step includes presenting a keyword for use in performing program recording reservation based on the destination set in the past and stored in the destination storing step, when the user is judged to be the user who performs program recording reservation in the user judging step.

6. The program recording method according to claim 1, wherein
the keyword presenting step includes presenting a keyword for use in performing program recording reservation, based on the destination received in the destination setting receiving step, and based on information relating to areas around the destination, when the user is judged to be the user who performs program recording reservation in the user judging step.

7. The program recording method according to claim 1, further comprising:
a program information acquiring step of acquiring program information relating to a recorded program;
a program information analysis step of analyzing the program information acquired in the program information acquiring step for extracting a keyword; and
a destination setting step of setting a new destination with use of the keyword extracted in the program information analysis step.

8. The program recording method according to claim 7, wherein
the program information acquiring step includes acquiring program information included in an electronic program guide, or program information included in a program recorded by the user.

9. The information recording method according to claim 7, wherein
the program information acquiring step includes acquiring program information which is not included in an electronic program guide, but is provided by a service provider.

10. The program recording method according to claim 7, wherein
the destination setting step includes switching between an automatic setting mode of automatically setting the destination, and a manual setting mode of manually setting the destination.

11. The program recording method according to claim 10, wherein
the destination setting step includes, when a distance between a user position representing the present position of the user, and a candidate position representing a place to be specified by the keyword extracted in the program information analysis step is not larger than a predetermined threshold value in the automatic setting mode, setting the candidate position as the destination.

12. The program recording method according to claim 10, wherein
the destination setting step includes specifying a user who sets the destination, and setting the destination only with use of a keyword extracted from program information relating to a program recorded by the specified user.

13. The program recording method according to claim 10, wherein
the destination setting step includes presenting the user with a place to be specified by the keyword extracted in the program information analysis step, and receiving selection, by the user, of a place to be designated as the destination from the presented place in the manual setting mode.

14. The program recording method according to claim 13, wherein
the destination setting step includes changing the order of the place to be presented in accordance with a travel time from the present position of the user to the place to be specified by the keyword.

15. A program recording device, comprising:
control circuitry and storage medium, the control circuitry which in operation:
receives setting of a destination by a user when a route from a present position to the destination is guided;
judges whether the user who sets the destination is a user who performs program recording reservation;
extracts a keyword for use in performing program recording reservation, based on the received destination, when the user is judged to be the user who performs program recording reservation;
presents the user with the extracted keyword;
receives selection, by the user, of the presented keyword;
selects a program associated with the selected keyword; and
reserves recording of the selected program.

* * * * *